(12) United States Patent
Smith et al.

(10) Patent No.: US 12,359,355 B2
(45) Date of Patent: *Jul. 15, 2025

(54) INSULATION PRODUCTS FORMED WITH AQUEOUS BINDER COMPOSITIONS

(71) Applicant: Owens Corning Intellectual Capital, LLC, Toledo, OH (US)

(72) Inventors: Kendel Smith, Westerville, OH (US); Xiujuan Zhang, New Albany, OH (US); Gert Mueller, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 730 days.

This patent is subject to a terminal disclaimer.

(21) Appl. No.: 17/601,982

(22) PCT Filed: Apr. 7, 2020

(86) PCT No.: PCT/US2020/026997
§ 371 (c)(1),
(2) Date: Oct. 7, 2021

(87) PCT Pub. No.: WO2020/210191
PCT Pub. Date: Oct. 15, 2020

(65) Prior Publication Data
US 2022/0213628 A1    Jul. 7, 2022

Related U.S. Application Data

(60) Provisional application No. 62/831,227, filed on Apr. 9, 2019.

(51) Int. Cl.
*D04H 1/64* (2012.01)
*C08K 7/14* (2006.01)
(Continued)

(52) U.S. Cl.
CPC ............... *D04H 1/641* (2013.01); *C08K 7/14* (2013.01); *C08L 29/04* (2013.01); *C08L 33/02* (2013.01); *D04H 1/4209* (2013.01); *E04B 1/80* (2013.01)

(58) Field of Classification Search
CPC ........ C03C 25/32; C08K 13/04; C08K 5/053; C08K 7/04; C08K 7/14; C08L 29/04;
(Continued)

(56) References Cited

U.S. PATENT DOCUMENTS 3,920,868 A    11/1975  Hammer
4,613,627 A     9/1986  Sherman et al.
(Continued)

FOREIGN PATENT DOCUMENTS

CA    1228557 A1    10/1987
CA    2301248 A1     9/2000
(Continued)

OTHER PUBLICATIONS

International Search Report and Written Opinion from PCT/US2020/026997 dated Jun. 19, 2020.
(Continued)

*Primary Examiner* — Lynda Salvatore
(74) *Attorney, Agent, or Firm* — Calfee, Halter & Griswold LLP

(57) ABSTRACT

A fibrous insulation product is discloses comprising a plurality of randomly oriented fibers and a thermoset aqueous binder composition at least partially coating said fibers. The binder composition comprises at least one long-chain polyol having at least two hydroxyl groups and a number average molecular weight of at least 2,000 Daltons, a cross-linking agent comprising at least two carboxylic acid groups, and a short-chain polyol having at least two hydroxyl groups and a number average molecular weight less than 2,000 Daltons, (Continued)

wherein a ratio of long-chain polyol to short-chain polyol is from 0.1/0.9 to 0.9/0.1.

24 Claims, 22 Drawing Sheets

(51) Int. Cl.
  *C08L 29/04* (2006.01)
  *C08L 33/02* (2006.01)
  *D04H 1/4209* (2012.01)
  *E04B 1/80* (2006.01)

(58) Field of Classification Search
  CPC ...... C08L 33/02; D04H 1/4209; D04H 1/641; D04H 1/4218; D04H 1/64; D04H 1/72; E04B 1/80; E04B 1/7604; E04B 1/7662; B32B 17/02; B32B 2250/02; B32B 2250/20; B32B 2260/021; B32B 2260/046; B32B 2262/0253; B32B 2262/0261; B32B 2262/0269; B32B 2262/0276; B32B 2262/0284; B32B 2262/062; B32B 2262/065; B32B 2262/10; B32B 2262/101; B32B 2262/105; B32B 2262/14; B32B 2307/304; B32B 2307/72; B32B 2307/732; B32B 2419/00; B32B 27/12; B32B 29/02; B32B 5/02; B32B 5/022; B32B 5/024; B32B 5/028; B32B 5/26
  See application file for complete search history.

(56) References Cited

U.S. PATENT DOCUMENTS

| | | |
|---|---|---|
| 4,777,763 A | 10/1988 | Shannon et al. |
| 4,794,728 A | 1/1989 | Tsukada et al. |
| 5,244,695 A | 9/1993 | Davidowich et al. |
| 5,300,192 A | 4/1994 | Hansen et al. |
| 5,318,990 A | 6/1994 | Strauss |
| 5,342,680 A | 8/1994 | Randall |
| 5,349,041 A | 9/1994 | Blum et al. |
| 5,600,919 A | 2/1997 | Kummermehr et al. |
| 5,644,880 A | 7/1997 | Lehnert et al. |
| 5,660,900 A | 8/1997 | Andersen et al. |
| 5,661,213 A | 8/1997 | Arkens et al. |
| 5,679,145 A | 10/1997 | Andersen et al. |
| 5,810,961 A | 9/1998 | Andersen et al. |
| 5,948,833 A | 9/1999 | Jilek et al. |
| 6,030,673 A | 2/2000 | Andersen et al. |
| 6,068,907 A | 5/2000 | Beauregard |
| 6,071,994 A | 6/2000 | Hummerich et al. |
| 6,079,153 A | 6/2000 | Templeton |
| 6,099,773 A | 8/2000 | Reck et al. |
| 6,123,172 A | 9/2000 | Byrd et al. |
| 6,146,746 A | 11/2000 | Reck et al. |
| 6,150,002 A | 11/2000 | Varona |
| 6,221,973 B1 | 4/2001 | Arkens et al. |
| 6,299,936 B1 | 10/2001 | Reck et al. |
| 6,305,495 B1 | 10/2001 | Keegan |
| 6,331,350 B1 | 12/2001 | Taylor et al. |
| 6,443,256 B1 | 9/2002 | Baig |
| 6,511,561 B1 | 1/2003 | Kohlhammer et al. |
| 6,699,945 B1 | 3/2004 | Chen et al. |
| 6,734,237 B1 | 5/2004 | Taylor et al. |
| 6,759,116 B2 | 7/2004 | Edlund |
| 6,774,071 B2 | 8/2004 | Horner et al. |
| 6,780,356 B1 * | 8/2004 | Putt .................. E04C 5/073 264/284 |
| 6,803,439 B2 | 10/2004 | Taylor |
| 6,818,694 B2 | 11/2004 | Hindi et al. |
| 6,838,163 B2 | 1/2005 | Smith et al. |
| 6,849,683 B2 | 2/2005 | Husemoen et al. |
| 6,884,838 B2 | 4/2005 | Taylor et al. |
| 6,933,349 B2 | 8/2005 | Chen et al. |
| 6,939,818 B2 | 9/2005 | Drax et al. |
| 6,951,602 B1 | 10/2005 | Reuter et al. |
| 7,026,390 B2 | 4/2006 | O'Brien-Bernini et al. |
| 7,067,579 B2 | 6/2006 | Taylor et al. |
| 7,141,284 B2 | 11/2006 | Newton et al. |
| 7,157,524 B2 | 1/2007 | Chen et al. |
| 7,199,179 B2 | 4/2007 | Clamen et al. |
| 7,300,892 B2 | 11/2007 | Porter |
| 7,338,702 B2 | 3/2008 | Swales et al. |
| 7,351,673 B1 | 4/2008 | Groh et al. |
| 7,377,084 B2 | 5/2008 | Swiszcz et al. |
| 7,459,490 B2 | 12/2008 | Husemoen et al. |
| 7,547,375 B2 | 6/2009 | Jaffee et al. |
| 7,641,764 B2 | 1/2010 | Yoshida et al. |
| 7,803,727 B2 | 9/2010 | Aseere et al. |
| 7,807,592 B2 | 10/2010 | Bland et al. |
| 7,824,762 B2 | 11/2010 | Ziegler |
| 7,829,488 B2 | 11/2010 | Bennett |
| 7,833,638 B2 | 11/2010 | Zheng et al. |
| 7,842,382 B2 | 11/2010 | Helbing |
| 7,893,154 B2 | 2/2011 | Van Herwijnen et al. |
| 7,989,370 B2 | 8/2011 | Currier et al. |
| 8,007,886 B2 | 8/2011 | Tierney et al. |
| 8,017,531 B2 | 9/2011 | Ahluwalia et al. |
| 8,044,168 B2 | 10/2011 | Gudik-Sorensen |
| 8,069,629 B2 | 12/2011 | Rockwell et al. |
| 8,084,379 B2 | 12/2011 | Hogan et al. |
| 8,127,509 B2 | 3/2012 | Propst |
| 8,133,952 B2 | 3/2012 | Pisanova et al. |
| 8,209,904 B2 | 7/2012 | Bouwens et al. |
| 8,211,974 B2 | 7/2012 | Shooshtari et al. |
| 8,283,266 B2 | 10/2012 | Jaffee et al. |
| 8,299,153 B2 | 10/2012 | Kelly |
| 8,329,798 B2 | 12/2012 | Clamen et al. |
| 8,329,817 B2 | 12/2012 | Espiard et al. |
| 8,357,746 B2 | 1/2013 | Shooshtari |
| 8,486,516 B2 | 7/2013 | Hauber et al. |
| 8,552,140 B2 | 10/2013 | Swift |
| 8,603,631 B2 | 12/2013 | Helbing |
| 8,604,122 B2 | 12/2013 | Kelly |
| 8,607,929 B2 | 12/2013 | Bliton et al. |
| 8,623,234 B2 | 1/2014 | Jaffrennou et al. |
| 8,650,913 B2 | 2/2014 | Chacko et al. |
| 8,652,579 B2 | 2/2014 | Shooshtari et al. |
| 8,791,198 B2 | 7/2014 | Miller et al. |
| 8,808,443 B2 | 8/2014 | Jaffrennou |
| 8,815,382 B2 | 8/2014 | Robinson, Jr. |
| 8,864,893 B2 | 10/2014 | Hawkins et al. |
| 8,865,816 B2 | 10/2014 | Zhang |
| 8,974,686 B2 | 3/2015 | Jaffrennou et al. |
| 8,980,774 B2 | 3/2015 | Zhang et al. |
| 9,039,827 B2 | 5/2015 | Hampson |
| 9,172,074 B2 | 10/2015 | Weber et al. |
| 9,174,868 B2 | 11/2015 | Jaffrennou et al. |
| 9,217,065 B2 | 12/2015 | Shoemake et al. |
| 9,238,749 B2 | 1/2016 | Michl et al. |
| 9,290,640 B2 | 3/2016 | Hawkins et al. |
| 9,309,436 B2 | 4/2016 | Swift |
| 9,359,720 B2 | 6/2016 | Chuda et al. |
| 9,376,810 B2 | 6/2016 | Kemp et al. |
| 9,382,404 B2 | 7/2016 | Zhang |
| 9,404,012 B2 | 8/2016 | Connaughton, I et al. |
| 9,453,140 B2 | 9/2016 | Varagnat et al. |
| 9,486,980 B2 | 11/2016 | Hauber et al. |
| PP27,475 P2 | 12/2016 | Kubby |
| 9,550,894 B2 | 1/2017 | Zhang et al. |
| 9,609,813 B2 | 4/2017 | Naerum et al. |
| 9,683,143 B2 | 6/2017 | Negri et al. |
| 9,715,872 B2 | 7/2017 | Guzman et al. |
| 9,777,472 B2 | 10/2017 | Wiker et al. |
| 9,815,928 B2 | 11/2017 | Williamson et al. |
| 9,822,042 B2 | 11/2017 | Rosenthal et al. |
| 9,840,061 B2 | 12/2017 | Jaffee |
| 9,869,089 B2 | 1/2018 | Thomas et al. |
| 9,896,807 B2 | 2/2018 | Englert et al. |
| 9,909,310 B2 | 3/2018 | Frank et al. |
| 9,922,634 B2 | 3/2018 | Thompson, Jr. et al. |

(56) References Cited

U.S. PATENT DOCUMENTS

| | | |
|---|---|---|
| 10,119,211 B2 | 11/2018 | Obert et al. |
| 10,368,502 B2 | 8/2019 | Letton et al. |
| 11,111,372 B2 * | 9/2021 | Zhang .................... D04H 1/64 |
| 11,136,451 B2 * | 10/2021 | Zhang .................... C03C 25/285 |
| 12,139,599 B2 * | 11/2024 | Zhang .................... C08K 5/17 |
| 2003/0060113 A1 | 3/2003 | Christie et al. |
| 2004/0038017 A1 | 2/2004 | Tutin et al. |
| 2004/0209074 A1 | 10/2004 | Randall et al. |
| 2004/0219847 A1 | 11/2004 | Miller |
| 2005/0059770 A1 | 3/2005 | Srinivasan et al. |
| 2005/0215153 A1 | 9/2005 | Cossement et al. |
| 2005/0284065 A1 | 12/2005 | Shaffer |
| 2005/0288424 A1 | 12/2005 | Fisler et al. |
| 2006/0036014 A1 | 2/2006 | Hogan et al. |
| 2006/0078719 A1 | 4/2006 | Miele |
| 2006/0079629 A1 * | 4/2006 | Taylor .................... D04H 1/64 |
| | | 524/556 |
| 2006/0101796 A1 | 5/2006 | Kern et al. |
| 2006/0137799 A1 | 6/2006 | Haque et al. |
| 2006/0168881 A1 | 8/2006 | Straumietis |
| 2006/0216489 A1 | 9/2006 | Shooshtari et al. |
| 2006/0217471 A1 | 9/2006 | Shooshtari et al. |
| 2006/0252855 A1 * | 11/2006 | Pisanova ................ D21H 17/06 |
| | | 524/47 |
| 2007/0010651 A1 | 1/2007 | Finch et al. |
| 2007/0125011 A1 | 6/2007 | Weir et al. |
| 2007/0270066 A1 | 11/2007 | Van Herwijnen et al. |
| 2007/0292619 A1 | 12/2007 | Srinivasan et al. |
| 2008/0047548 A1 | 2/2008 | Konietzny et al. |
| 2008/0138526 A1 | 6/2008 | Tutin et al. |
| 2008/0152816 A1 | 6/2008 | Clamen et al. |
| 2008/0176050 A1 | 7/2008 | Lintz et al. |
| 2009/0036011 A1 | 2/2009 | Hunig et al. |
| 2009/0156724 A1 | 6/2009 | Espiard et al. |
| 2009/0208714 A1 | 8/2009 | Currier et al. |
| 2010/0016143 A1 | 1/2010 | Shooshtari et al. |
| 2010/0040832 A1 | 2/2010 | Herbert |
| 2010/0064618 A1 | 3/2010 | Boyd |
| 2010/0105272 A1 | 4/2010 | Nandi et al. |
| 2010/0154300 A1 | 6/2010 | Wiersma |
| 2010/0273006 A1 | 10/2010 | Rodrigues et al. |
| 2010/0320113 A1 | 12/2010 | Swift |
| 2011/0003522 A1 | 1/2011 | Chen et al. |
| 2011/0159768 A1 | 6/2011 | Crescimanno et al. |
| 2011/0189478 A1 | 8/2011 | Zhang et al. |
| 2012/0064323 A1 | 3/2012 | Shoemake et al. |
| 2012/0076983 A1 | 3/2012 | Yu et al. |
| 2012/0168054 A1 | 7/2012 | Chen et al. |
| 2012/0245277 A1 | 9/2012 | Michl et al. |
| 2012/0311744 A1 | 12/2012 | Sirkowski |
| 2013/0023174 A1 | 1/2013 | Quinn |
| 2013/0026408 A1 | 1/2013 | Jaffrennou et al. |
| 2013/0032749 A1 | 2/2013 | Jaffrennou et al. |
| 2013/0084445 A1 | 4/2013 | Haley et al. |
| 2013/0157030 A1 | 6/2013 | Frick et al. |
| 2013/0244525 A1 | 9/2013 | Chacko et al. |
| 2013/0334726 A1 * | 12/2013 | Hernandez-Torres ... D04H 1/64 |
| | | 264/129 |
| 2014/0038485 A1 | 2/2014 | Anderson et al. |
| 2014/0083328 A1 | 3/2014 | Lochel, Jr. et al. |
| 2014/0120348 A1 | 5/2014 | Didier et al. |
| 2014/0155353 A1 | 6/2014 | Tezuka et al. |
| 2014/0186635 A1 | 7/2014 | Mueller |
| 2014/0245797 A1 * | 9/2014 | Haley .................... D04H 1/60 |
| | | 65/460 |
| 2014/0350142 A1 | 11/2014 | Hansen et al. |
| 2015/0010730 A1 | 1/2015 | Faynot et al. |
| 2015/0027052 A1 | 1/2015 | Janssen et al. |
| 2015/0152244 A1 | 6/2015 | Hernandez-Torres |
| 2015/0373936 A1 | 12/2015 | Bouwens et al. |
| 2016/0088809 A1 | 3/2016 | Lowe et al. |
| 2016/0131299 A1 | 5/2016 | Mueller et al. |
| 2016/0143228 A1 | 5/2016 | De Groot et al. |
| 2016/0145779 A1 | 5/2016 | Teng et al. |
| 2016/0208439 A1 | 7/2016 | Lelogeay |
| 2016/0208483 A1 | 7/2016 | Takeuchi et al. |
| 2016/0219810 A1 | 8/2016 | Erkkiläet al. |
| 2016/0264461 A1 | 9/2016 | Peng et al. |
| 2016/0280971 A1 | 9/2016 | Hampson et al. |
| 2017/0022398 A1 | 1/2017 | Lochel, Jr. et al. |
| 2017/0037187 A1 | 2/2017 | Appley et al. |
| 2017/0150684 A1 | 6/2017 | Vuorinen et al. |
| 2017/0150687 A1 | 6/2017 | Loiske et al. |
| 2017/0190902 A1 | 7/2017 | Swift |
| 2017/0197379 A1 | 7/2017 | Teng et al. |
| 2017/0198142 A1 | 7/2017 | Hampson et al. |
| 2017/0210952 A1 | 7/2017 | Hampson et al. |
| 2017/0305783 A1 | 10/2017 | Faynot et al. |
| 2017/0332568 A1 | 11/2017 | Storey |
| 2017/0349718 A1 | 12/2017 | Albani et al. |
| 2017/0368792 A1 | 12/2017 | Faotto |
| 2018/0023291 A1 * | 1/2018 | Wiker .................... E04B 9/045 |
| | | 181/211 |
| 2018/0031268 A1 | 2/2018 | Lopez Belbeze et al. |
| 2018/0037273 A1 | 2/2018 | Aarts et al. |
| 2018/0116131 A1 | 5/2018 | Leo |
| 2018/0139911 A1 | 5/2018 | Janssen |
| 2018/0312661 A1 | 11/2018 | Hernandez-Torres et al. |
| 2019/0106563 A1 | 4/2019 | Zhang et al. |
| 2019/0106564 A1 | 4/2019 | Zhang et al. |
| 2019/0124864 A1 | 5/2019 | Bassin et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2020/0270404 A1 | 8/2020 | Funakoshi et al. |
| 2021/0095156 A1 | 4/2021 | Swift et al. |
| 2021/0171757 A1 | 6/2021 | Mueller et al. |
| 2021/0172166 A1 | 6/2021 | Grant et al. |
| 2021/0395508 A1 | 12/2021 | Zhang et al. |
| 2022/0064408 A1 | 3/2022 | Zhang et al. |
| 2022/0106419 A1 | 4/2022 | Mueller et al. |
| 2022/0106492 A1 | 4/2022 | Click et al. |
| 2022/0162410 A1 | 5/2022 | Mueller et al. |
| 2023/0348682 A1 | 11/2023 | Zhang et al. |

FOREIGN PATENT DOCUMENTS

| | | | |
|---|---|---|---|
| CA | 2 604 809 | * 5/2005 | ............... B32B 5/02 |
| CA | 2834816 A1 | 11/2012 | |
| CA | 2604809 C | 4/2013 | |
| CN | 102533168 A | 7/2012 | |
| EP | 0194242 B1 | 10/1989 | |
| EP | 442811 B2 | 12/1993 | |
| EP | 583086 B1 | 11/1997 | |
| EP | 1022400 A1 | 7/2000 | |
| EP | 0826710 B1 | 9/2001 | |
| EP | 715805 B1 | 7/2002 | |
| EP | 1522532 A1 | 4/2005 | |
| EP | 1038433 B1 | 6/2008 | |
| EP | 2071066 A1 | 6/2009 | |
| EP | 2093266 A1 | 8/2009 | |
| EP | 2324089 A1 | 5/2011 | |
| EP | 2268126 B1 | 4/2012 | |
| EP | 1303672 B1 | 2/2015 | |
| EP | 2690217 B1 | 3/2015 | |
| EP | 2855601 B1 | 9/2016 | |
| EP | 3034555 B1 | 4/2017 | |
| EP | 2197928 A1 | 5/2017 | |
| EP | 2694717 A1 | 6/2017 | |
| EP | 2844621 B1 | 6/2017 | |
| EP | 1656981 B1 | 1/2018 | |
| EP | 1800853 B1 | 2/2018 | |
| EP | 2755498 B1 | 2/2018 | |
| EP | 2324089 B1 | 3/2018 | |
| EP | 2231543 B1 | 9/2018 | |
| JP | 2013151777 A | 8/2013 | |
| JP | 2017106133 A | 6/2017 | |
| WO | 9204824 A1 | 4/1992 | |
| WO | 9318642 A1 | 9/1993 | |

(56) References Cited

FOREIGN PATENT DOCUMENTS

| | | |
|---|---|---|
| WO | 9961384 A1 | 12/1999 |
| WO | 2004076734 A1 | 9/2004 |
| WO | 2004098270 A1 | 11/2004 |
| WO | 2006136389 A1 | 12/2006 |
| WO | 2007149644 A1 | 12/2007 |
| WO | 2008009460 A1 | 1/2008 |
| WO | 2008009462 A1 | 1/2008 |
| WO | 2008009465 A1 | 1/2008 |
| WO | 2009080822 A1 | 7/2009 |
| WO | 2011044490 A1 | 4/2011 |
| WO | 2012118939 A1 | 9/2012 |
| WO | 2013021234 A1 | 2/2013 |
| WO | 2015144843 A1 | 10/2015 |
| WO | 2016025987 A2 | 2/2016 |
| WO | 2017074853 A1 | 5/2017 |
| WO | 2017084853 A1 | 5/2017 |
| WO | 2017157525 A1 | 9/2017 |
| WO | 2018010558 A1 | 1/2018 |
| WO | 2018158677 A1 | 9/2018 |
| WO | 2019074867 A1 | 4/2019 |
| WO | 2020144436 A1 | 7/2020 |
| WO | 2021118951 A1 | 6/2021 |
| WO | 2022051213 A1 | 3/2022 |

OTHER PUBLICATIONS

Office Action from CN Application No. 202080037207.X dated Feb. 3, 2023.
Office Action from CN Application No. 202080037207.X dated Dec. 22, 2023.
Extended European Search Report from EP Application No. 20788166.5 dated Dec. 16, 2022.
Office Action from CN Application No. 202080037207.X dated Apr. 10, 2024.
Wikipedia, "Triose," retrieved from <https://en.wikipedia.org/wiki/Triose> on Oct. 29, 2021.
Office Action from JP Application No. 2021-559780 dated Dec. 18, 2023.
Lee et al., "A Review on Citric Acid as Green Modifying Agent and Binder for Wood," Polymers, 2020; 12(8):1692, 21 pages.
Office Action from CN Application No. 202080037207.X dated Aug. 4, 2023.
Office Action from KR Application No. 10-2021-7036373 dated Jul. 23, 2024.

\* cited by examiner

INSULATION PRODUCTS FORMED WITH AQUEOUS BINDER COMPOSITIONS

RELATED APPLICATIONS

This application is the U.S. national stage entry of International Application No. PCT/US2020/026997, filed Apr. 7, 2020, which claims priority to and the benefit of U.S. Provisional Application No. 62/831,227, filed Apr. 9, 2019, the entire contents of which are is incorporated by reference herein.

BACKGROUND

Fibrous insulation products and construction panels are typically manufactured by fiberizing a molten composition of polymer, glass, or other mineral material to form fine fibers and depositing the fibers on a collecting conveyor to form a batt or a blanket. Mineral fibers, such as glass fibers or mineral wool, are typically used in insulation products. A binder composition is then applied to bind the fibers together where they contact each other. During the manufacturing process, some insulation products are formed and cut to provide sizes generally dimensioned to be compatible with standard construction practices, e.g. ceiling boards having widths and/or length adapted for specific building practices. Ceiling board products may also incorporate a facing layer or material on at least one of the major surfaces, forming ceiling tiles or panels. In some applications, the facer may be an aesthetic or decorative surface and is often painted.

Fibrous insulation products may be characterized by many different properties, such as for example, density. Low density insulation batts and blankets typically have densities between 0.1 square foot weight to 0.56 square foot weight (or 0.1 pounds/cubic foot ("pcf") to 2.5 pcf), and are often used for residential insulation in walls, attics and basements. Low (or "light") density insulation products are often used in residential applications, including but not limited to insulation, duct wrap, metal building insulation, etc. Fibrous insulation products also include higher density products having densities from 2.5 pcf to 10 pcf, such as boards and panels or formed products. Higher density insulation products are often referred to as "heavy density" products and are used in industrial and/or commercial applications, including but not limited to wall and ceiling insulation, pipe or tank insulation, insulative ceiling and wall panels, duct boards, industrial board, acoustic board, etc. Ceiling boards/tiles are often used to impart both structural and aesthetic value, while also providing acoustical absorbency and attenuation, to building interiors. Ceiling tiles may be used in areas that require noise control, such as public areas and are also used in residential buildings.

Insulation products traditionally utilize phenol-formaldehyde binder technology for the production of heavy density products that are inexpensive and have acceptable physical and mechanical properties. However, formaldehyde binders emit undesirable emissions during the manufacturing of the fiberglass insulation.

As an alternative to formaldehyde-based binders, certain formaldehyde-free formulations have been developed for use as a binder in fiberglass insulation products. One of the challenges to developing suitable alternatives, however, is to identify formulations that have comparable mechanical and physical properties, while avoiding undesirable properties, such as discoloration. Such property challenges include hot/humid performance, stiffness, bond strength, processability (viscosity, cutting, sanding, edge painting), and achieving a light color without yellowing.

For example, ceiling tiles often have at least one scrim adhered thereto, which may be painted with a white (or otherwise colored) paint. It has been found that white painted tiles formed using a formaldehyde-free binder, when stored, tend to yellow after time. Thus, the panels may not provide a uniform color if tiles from different boards are used.

Additionally, maintaining stiffness and rigidity of ceiling panels under high humidity conditions continue to be a problem for the ceiling tile industry. The problem is acute since the tiles and boards which are used in ceilings are supported only around their perimeters. Humidity weakens the tile and, due to the limited support around the perimeter, the tile unacceptably sags.

Accordingly, there is a need for low and heavy density insulation products formed using an environmentally friendly, formaldehyde-free binder composition while maintaining acceptable physical and mechanical properties.

SUMMARY

Various aspects of the present inventive concepts are directed to a fibrous insulation product comprising a plurality of randomly oriented fibers and a thermoset aqueous binder composition at least partially coating said fibers. The binder composition comprises at least one long-chain polyol having at least two hydroxyl groups and a number average molecular weight of at least 2,000 Daltons, a cross-linking agent comprising at least two carboxylic acid groups, and a short-chain polyol having at least two hydroxyl groups and a number average molecular weight less than 2,000 Daltons, wherein a ratio of long-chain polyol to short-chain polyol is from 0.1/0.9 to 0.9/0.1.

In some exemplary embodiments, the fibers comprise one or more of mineral fibers, mineral wool fibers, natural fibers, and synthetic fibers.

In some exemplary embodiments, the insulation product is a low-density insulation product having a density between 0.1 and 0.56 square foot weight. The low-density insulation product may have a thickness between 0.5 and 25 inches. The low-density insulation product may be an insulation batt, insulation blanket, duct wrap, or metal building insulation.

In some exemplary embodiments, the insulation product is a high-density insulation product having a density between 1.0 and 10 lbs/ft3. The high-density insulation product may have a thickness between 0.2 and 5.0 inches. In some exemplary embodiments, the high-density insulation product comprises wall or ceiling insulation, pipe or tank insulation, duct board, industrial board, or acoustic board.

In some exemplary embodiments, the insulation product further includes one or more reinforcement or scrim materials adhered to the fibrous insulation product.

In some exemplary embodiments, the fibrous insulation product has a binder LOI between 0.5% and 9%, including between 2% and 7.0%.

Various aspects of the present inventive concepts are directed to a ceiling board product comprising a fibrous insulation product. The fibrous insulation product comprises a plurality of randomly oriented fibers and an aqueous binder composition at least partially coating the fibers. The binder composition comprises at least one long-chain polyol having at least two hydroxyl groups and a number average molecular weight of at least 2,000 Daltons; a cross-linking agent comprising at least two carboxylic acid groups; and a short-chain polyol having at least two hydroxyl groups and a number average molecular weight less than 2,000 Daltons, wherein a ratio of long-chain polyol to short-chain polyol is from 0.1/0.9 to 0.9/0.1.

In some exemplary embodiments, the fibrous insulation product comprises glass fiber having a diameter between 35 HT and 50 HT. The fibrous insulation product may include a binder LOI between 8% and 16%, including between 9% and 12%. In some exemplary embodiments, the board has a finished ceiling tile sag rating of less than 0.3" under both ambient and hot/humid conditions. In some exemplary embodiments, the board achieves a flame spread of no greater than 5, according to ASTM E84.

Various aspects of the present inventive concepts are further directed to duct board product comprising a fibrous insulation product having a first major surface and a second major surface, opposite the first major surface. The fibrous insulation product comprises a plurality of randomly oriented fibers; and an aqueous binder composition at least partially coating the fibers, said binder composition comprising at least one long-chain polyol having at least two hydroxyl groups and a number average molecular weight of at least 2,000 Daltons; a cross-linking agent comprising at least two carboxylic acid groups; and a short-chain polyol having at least two hydroxyl groups and a number average molecular weight less than 2,000 Daltons, wherein a ratio of long-chain polyol to short-chain polyol is from 0.1/0.9 to 0.9/0.1.

In some exemplary embodiments, the fibrous insulation product comprises glass fibers having a diameter between 20 HT and 80 HT. The fibrous insulation product m a ay comprise a density between 2.0 lbs/ft$^3$ and 6.0 lbs/ft$^3$, such as between 3.2 lbs/ft$^3$ and 5.3 lbs/ft$^3$.

In some exemplary embodiments, the fibrous insulation product has a thickness between 0.5 and 5.0 inches. Additionally, the fibrous insulation product may include a binder LOI between 13% and 23%, including between 15% and 19%.

In some exemplary embodiments, the fibrous insulation product further includes a facer adhered to the first major surface. The facer may comprise a coated fiber mat facer or a foil-scrim-kraft (FSK) facer.

In some exemplary embodiments, the fibrous insulation product further includes a veil adhered to the second major surface. The veil may comprise a fiberglass veil comprising glass fibers with diameters between 10 and 15 microns.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as illustrative embodiments and advantages thereof, are described below in greater detail, by way of example, with reference to the drawings in which.

DETAILED DESCRIPTION

Figure 1:
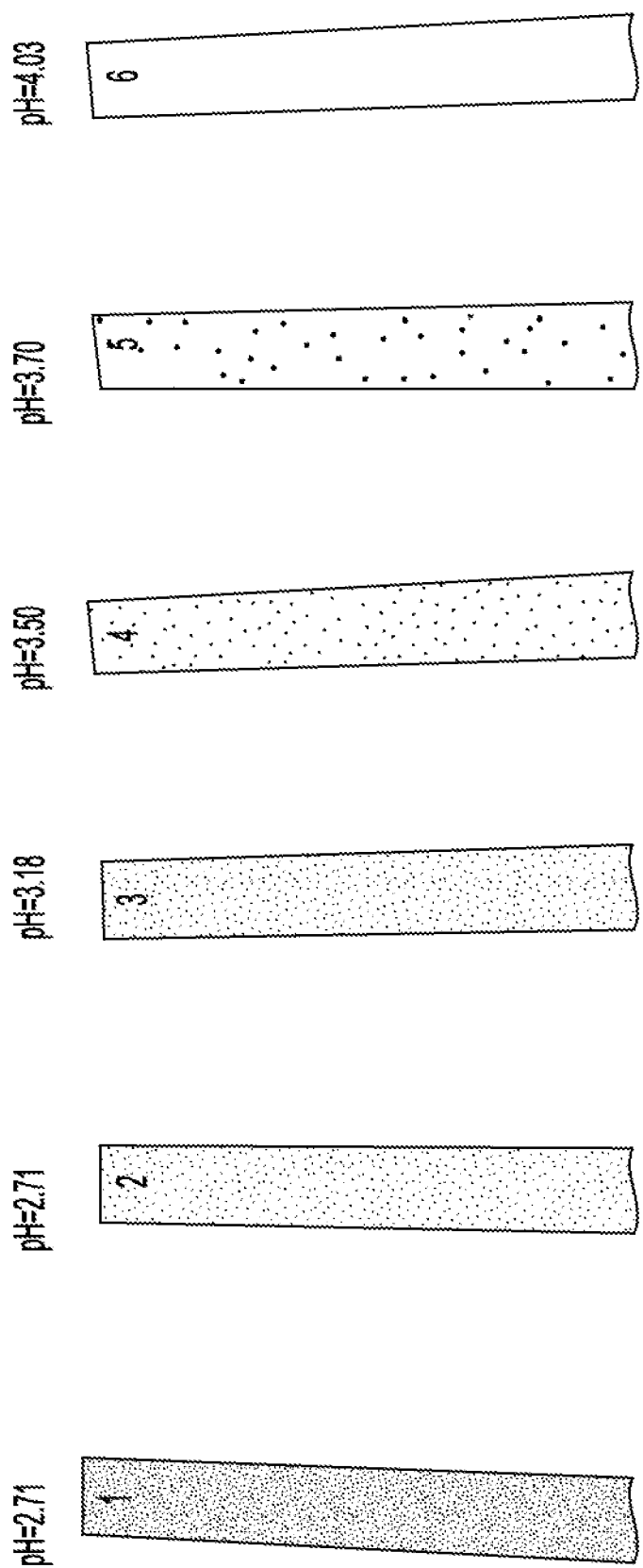
FIG. 1 illustrates exemplary fiberglass sheet strips coated with cured binder compositions according to the present application, with varying pH and cure color.

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The present inventive concepts are directed to fibrous insulation products, such as residential, commercial, and industrial insulation, ceiling board and ceiling tiles formed therefrom, duct board, duct wrap, metal building insulation, acoustic panels, and the like, that are generally formed of a collection of fibers bonded together by a cured thermoset polymeric binder material. The fibrous product may comprise inorganic fibers, organic fibers, or a mixture thereof. Examples of suitable inorganic fibers include glass fibers, wool glass fibers, and ceramic fibers. Optionally, other reinforcing fibers such as natural fibers and/or synthetic fibers, such as polyester, polyethylene, polyethylene terephthalate, polypropylene, polyamide, aramid, and/or polyaramid fibers may be present in the insulation product in addition to the inorganic fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include basalt, cotton, jute, bamboo, ramie, bagasse, hemp, coir, linen, kenaf, sisal, flax, henequen, and combinations thereof. Insulation products may be formed entirely of one type of fiber, or they may be formed of a combination of types of fibers. For example, the insulation product may be formed of combinations of various types of glass fibers or various combinations of different inorganic fibers and/or natural fibers depending on the desired application for the insulation.

Although various types of fibrous insulation products and processes for manufacturing such products are known, one example of the manufacture of glass fiber or mineral insulation is carried out in a continuous process by rotary fiberization of molten glass or other mineral material. Blowers then direct the fibers toward a conveyor to form a fibrous pack. The fibers are sprayed with a binder composition and optionally with water, such that the binder composition is essentially evenly distributed throughout the formed insulation pack.

Fibers having the uncured resinous binder adhered thereto may be gathered and formed into an uncured insulation pack and compressed to the desired area weight on a forming conveyor. A vacuum draws air through the fibrous pack from below the forming conveyor, which further compresses the insulation pack. The residual heat from the glass fibers and the flow of air through the fibrous pack during the forming operation are generally sufficient to volatilize a majority of the water from the binder and optional water spray before the glass fibers exit the forming chamber, thereby leaving the remaining components of the binder on the fibers as a viscous or semi-viscous high-solids liquid.

The insulation pack is then directed in its partial compressed condition to the curing oven. It is then compressed to the desired thickness between the top and bottom oven chains while passing through a curing oven at a temperature sufficient to cure the binder to achieve dimensional and mass stability to the plurality of glass fibers constituting the body. The curing oven may be operated at a temperature from 100° C. to 325° C., or from 175° C. to 300° C. Forced air may be blown through the insulation pack to advance the binder cure and drive off residual moisture or condensation products formed during cure. The insulation pack may remain within the oven for a period of time sufficient to crosslink (cure) the binder and form the insulation board. The insulation board may be cut into predetermined lengths by a cutting device and subsequently stored.

One or more reinforcement materials or scrims may then be adhered to the insulation board to form a faced product, such as a ceiling or duct board product. Non-limiting examples of suitable scrim materials include woven or nonwoven fiberglass mats, Kraft paper, a foil-scrim-Kraft paper laminate, recycled paper, and calendared paper. The reinforcement material may be adhered to the surface of the insulation board by any bonding agent or adhesive material conventionally used in the art. Suitable bonding agents include adhesives, polymeric resins, asphalt, and bituminous materials that can be coated or otherwise applied to the reinforcement material.

The insulation products may include low and heavy density insulation products manufactured with a no-added formaldehyde or formaldehyde-free aqueous binder composition that has comparable or improved mechanical and physical performance, including reduced or no yellowing in downstream applications, compared to products manufactured with traditional no-added formaldehyde or formaldehyde-free binder compositions.

The low-density fibrous insulation product may have a density between 0.1 pcf and 2.5 pcf, including between 0.5 pcf and 2.0 pcf, and between 0.8 pcf and 1.5 pcf. The fibrous insulation product may have a thickness between 0.5 inches and 25 inches.

The heavy density fibrous insulation product may have a density between 2.5 and 10 pcf, including between 3.0 pcf and 8 pcf, and between 5.0 pcf and 7.5 pcf. The fibrous insulation product may have a thickness between 0.2 and 5.0 inches, including between 0.5 and 4.0 inches, 0.6 and 3.5 inches, and 0.8 and 3.0 inches.

The fibrous insulation product is formed using a formaldehyde-free (or no added formaldehyde) aqueous binder composition. In some exemplary embodiments, the formaldehyde-free aqueous binder composition includes at least one long-chain polyol, and at least one primary cross-linking agent, and at least one secondary cross-linking agent comprising at least one short-chain polyol.

The primary crosslinking agent may be any compound suitable for crosslinking the polyol. In exemplary embodiments, the primary crosslinking agent has a number average molecular weight greater than 90 Daltons, from 90 Daltons to 10,000 Daltons, or from 190 Daltons to 5,000 Daltons. In some exemplary embodiments, the crosslinking agent has a number average molecular weight of 2,000 Daltons to 5,000 Daltons, or 4,000 Daltons. Non-limiting examples of suitable crosslinking agents include materials having one or more carboxylic acid groups (—COOH), such as polycarboxylic acids (and salts thereof), anhydrides, monomeric and polymeric polycarboxylic acid with anhydride (i.e., mixed anhydrides), and homopolymer or copolymer of acrylic acid, such as polyacrylic acid (and salts thereof) and polyacrylic acid-based resins such as QR-1629S and Acumer 9932, both commercially available from The Dow Chemical Company. Acumer 9932 is a polyacrylic acid/sodium hypophosphite resin having a molecular weight of 4000 and a sodium hypophosphite content of 6-7% by weight. QR-1629S is a polyacrylic acid/glycerin mixture.

The primary cross-linking agent may, in some instances, be pre-neutralized with a neutralization agent. Such neutralization agents may include organic and/or inorganic bases, such sodium hydroxide, ammonium hydroxide, and diethylamine, and any kind of primary, secondary, or tertiary amine (including alkanol amine). In various exemplary embodiments, the neutralization agents may include at least one of sodium hydroxide and triethanolamine.

In some exemplary embodiments, the primary crosslinking agent is present in the aqueous binder composition in at least 50 wt. %, based on the total solids content of the aqueous binder composition, including, without limitation at least 55 wt. %, at least 60 wt. %, at least 63 wt. %, at least 65 wt. %, at least 70 wt. %, at least 73 wt. %, at least 75 wt. %, at least 78 wt. %, and at least 80 wt. %. In some exemplary embodiments, the primary crosslinking agent is present in the aqueous binder composition in an amount from 50% to 85% by weight, based on the total solids content of the aqueous binder composition, including without limitation 60% to 80% by weight, 62% to 78% by weight, and 65% to 75% by weight.

In some exemplary embodiments, the long-chain polyol comprises a polyol having at least two hydroxyl groups having a number average molecular weight of at least 2,000 Daltons, such as a molecular weight between 3,000 Daltons and 4,000 Daltons. In some exemplary embodiments, the long-chain polyol comprises one or more of a polymeric polyhydroxy compound, such as a polyvinyl alcohol, polyvinyl acetate, which may be partially or fully hydrolyzed, or mixtures thereof. Illustratively, when a partially hydrolyzed polyvinyl acetate serves as the polyhydroxy component, an 80%-89% hydrolyzed polyvinyl acetate may be utilized, such as, for example Poval® 385 (Kuraray America, Inc.) and Sevol™ 502 (Sekisui Specialty Chemicals America, LLC), both of which are 85% (Poval® 385) and 88% (Selvol™ 502) hydrolyzed.

The long-chain polyol may be present in the aqueous binder composition in an amount up to 50% by weight total solids, including without limitation, up to 28%, 25%, 20%, 18%, 15%, and 13% by weight total solids. In some exemplary embodiments, the long-chain polyol is present in the aqueous binder composition in an amount from 5.0% to 30% by weight total solids, including without limitation 7% to 25%, 8% to 20%, 9% to 18%, and 10% to 16%, by weight total solids, including all endpoints and sub-combinations therebetween.

Optionally, the aqueous binder composition includes a secondary crosslinking agent, such as a short-chain polyol. The short-chain polyol may comprise a water-soluble compound having a molecular weight of less than 2,000 Daltons, including less than 750 Daltons, less than 500 Daltons and having a plurality of hydroxyl (—OH) groups. Suitable short-chain polyol components include sugar alcohols, 2,2-bis(methylol)propionic acid (bis-MPA), tri(methylol)propane (TMP), pentaerythritol, and short-chain alkanolamines, such as triethanolamine. In some exemplary embodiments, the short-chain polyol serves as a viscosity reducing agent, which breaks down the intra and inter molecular hydrogen bonds between the long-chain polyol molecules (e.g., polyvinyl alcohol) and thus lowers the viscosity of the composition. However, as these small-chain polyol molecules have similar structures to the long-chain polyols, they can react similarly with cross-linking agents, thus they do not negatively impact the binder and product performance.

Sugar alcohol is understood to mean compounds obtained when the aldo or keto groups of a sugar are reduced (e.g. by hydrogenation) to the corresponding hydroxy groups. The starting sugar might be chosen from monosaccharides, oligosaccharides, and polysaccharides, and mixtures of those products, such as syrups, molasses and starch hydrolyzates. The starting sugar also could be a dehydrated form of a sugar. Although sugar alcohols closely resemble the corresponding starting sugars, they are not sugars. Thus, for instance, sugar alcohols have no reducing ability, and cannot participate in the Maillard reaction typical of reducing sugars. In some exemplary embodiments, the sugar alcohol includes glycerol, erythritol, arabitol, xylitol, sorbitol, maltitol, mannitol, iditol, isomaltitol, lactitol, cellobitol, palatinitol, maltotritol, syrups thereof and mixtures thereof. In various exemplary embodiments, the sugar alcohol is selected from glycerol, sorbitol, xylitol, and mixtures thereof. In some exemplary embodiments, the secondary cross-linking agent is a dimeric or oligomeric condensation product of a sugar alcohol. In various exemplary embodiments, the condensation product of a sugar alcohol is isosorbide. In some exemplary embodiments, the sugar alcohol is a diol or glycol.

In some exemplary embodiments, the short-chain polyol is present in the aqueous binder composition in an amount up to 50% by weight total solids, including without limitation, up to 25%, 20%, 18%, 15%, 13%, 11%, and 10% by weight total solids. In some exemplary embodiments, the short-chain polyol is present in the aqueous binder composition in an amount from 0 to 30% by weight total solids, including without limitation 2% to 30%, 3% to 25%, 5% to 20%, 8% to 18%, and 9% to 15%, by weight total solids, including all endpoints and sub-combinations therebetween.

In various exemplary embodiments, the long-chain polyol, crosslinking agent, and small-chain polyol are present in amounts such that the ratio of the number of molar equivalents of carboxylic acid groups, anhydride groups, or salts thereof to the number of molar equivalents of hydroxyl groups is from 1/0.05 to 1/5, such as from 1/0.08 to 1/2.0, from 1/0.1 to 1/1.5, and 1/0.3 to 1/0.66. It has surprisingly been discovered, however, that within this ratio, the ratio of long-chain polyol to short-chain polyol effects the performance of the binder composition, such as the tensile strength and water solubility of the binder after cure. For instance, it has been discovered that a ratio of long-chain polyol to short-chain polyol between 0.1/0.9 to 0.9/0.1, such as between 0.3/0.7 and 0.7/0.3, or between 0.4/0.6 and 0.6/0.4 provides a balance of desirable mechanical and physical properties. In various exemplary embodiments, the ratio of long-chain polyol to short-chain polyol is approximately 0.5/0.5.

The ratio of long-chain polyol to short-chain polyol may be optimized such that particular properties are optimized, depending on the needs of an end-use application. For instance, as the concentration of long-chain polyol decreases, the color intensity of the binder decreases (more white). However, lowering the long-chain polyol concentration may also decrease the tensile strength of a product formed with the binder composition. Thus, a balance between various properties has been unexpectedly struck within the ratios disclosed herein.

Optionally, the aqueous binder composition may include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst.

The catalyst may be present in the aqueous binder composition in an amount from 0% to 10% by weight of the total solids in the binder composition, including without limitation, amounts from 1% to 5% by weight, or from 2% to 4.5% by weight, or from 2.8% to 4.0% by weight, or from 3.0% to 3.8% by weight.

Optionally, the aqueous binder composition may contain at least one coupling agent. In at least one exemplary embodiment, the coupling agent is a silane coupling agent. The coupling agent(s) may be present in the binder composition in an amount from 0.01% to 5% by weight of the total solids in the binder composition, from 0.01% to 2.5% by weight, from 0.05% to 1.5% by weight, or from 0.1% to 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyl-triethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxytrihydroxysilanes, methacryl trihydroxy silanes, and/or hydrocarbon trihydroxysilanes. In one or more exemplary embodiment, the silane is an aminosilane, such as γ-aminopropyltriethoxysilane.

Optionally, the aqueous binder composition may include a process aid. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from 0 to 10% by weight, from 0.1% to 5.0% by weight, or from 0.3% to 2.0% by weight, or from 0.5% to 1.0% by weight, based on the total solids content in the binder composition. In some exemplary embodiments, the aqueous binder composition is substantially or completely free of any processing aids.

Examples of processing aids include defoaming agents, such as, emulsions and/or dispersions of mineral, paraffin, or vegetable oils; dispersions of polydimethylsiloxane (PDMS) fluids, and silica which has been hydrophobized with polydimethylsiloxane or other materials. Further processing aids may include particles made of amide waxes such as ethylenebis-stearamide (EBS) or hydrophobized silica. A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluoronanoate, and perfluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), and polyoxyethylenealkylamines.

Suitable nonionic surfactants that can be used in conjunction with the binder composition include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy)ethanols having alkyl groups containing from 7 to 18 carbon atoms and having from 4 to 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from 6 to 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants include one or more of Dynol 607, which is a 2,5,8,11-tetramethyl-6-dodecyne-5,8-diol, SURFONYL® 420, SURFONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2-ethylhexyl) sodium sulfosuccinate), and Triton™ CF-10 (poly(oxy-1,2-ethanediyl), alpha-(phenylmethyl)-omega-(1,1,3,3-tetramethylbutyl)phenoxy).

The surfactant may be present in the binder composition in an amount from 0 to 10% by weight, from 0.1% to 5.0% by weight, or from 0.3% to 2.0% by weight, or from 0.5% to 1.0% by weight, based on the total solids content in the binder composition.

The binder composition may also include organic and/or inorganic acids and bases as pH adjusters in an amount sufficient to adjust the pH to a desired level. The pH may be adjusted depending on the intended application, to facilitate the compatibility of the ingredients of the binder composition, or to function with various types of fibers. In some exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a crosslinking agent. In other exemplary embodiment, organic and/or inorganic bases, can be included to increase the pH of the binder composition. In some exemplary embodiments, the bases may be a volatile or non-volatile base. Exemplary volatile bases include, for example, ammonia and alkyl-substituted amines, such as methyl amine, ethyl amine or 1-aminopropane, dimethyl amine, and ethyl methyl amine. Exemplary non-volatile bases include, for example, sodium hydroxide, potassium hydroxide, sodium carbonate, and t-butylammonium hydroxide.

The pH of the binder composition cures under acidic conditions and has a natural pH between 2.0-3.0. At this pH, the binder composition may have an orange-red color upon cure, and this color varies in appearance due to binder concentration and cure temperature. It is believed that the long-chain polyol (e.g., polyvinyl alcohol) undergoes rapid chain-stripping elimination of water at temperatures above its decomposition temperature, which causes the color to change from yellow to orange, to dark brown, to black. This reaction is acid-catalyzed, which leads to most carboxylic acid and polyvinyl alcohol-containing binders to have a yellow-orange color.

Such a color and varied appearance may be undesirable for some applications, particularly applications that involve exposed boards. However, it has been unexpectedly discovered that raising the pH slightly, such as by 0.25 to 2.0 pH units, causes the color to significantly lighten and reduces the varied or marbled appearance. In particular, the color appearance can be shifted from an orange-red color to an off-white color by increasing the pH by 0.5 to 1.5 pH units, or by 1.0 to 1.5 pH units.

As illustrated in FIG. 1, as the pH of the binder composition increases, the color of the cured binder composition dramatically lightens from a dark orange color at a pH of 2.7 to an essentially white color at a pH of 4.03. A significant color change began to occur as the pH approaches 3.5.

Figure 2:
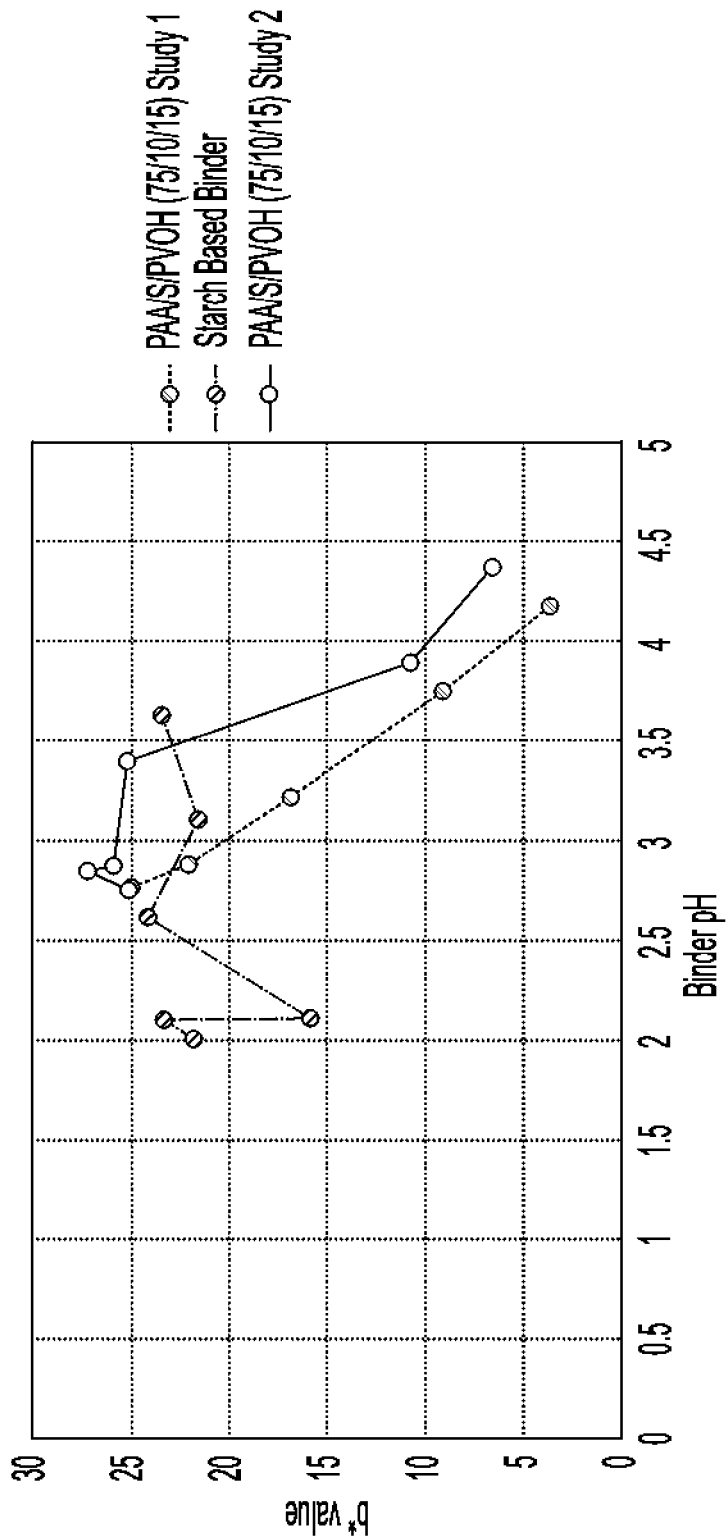
FIG. 2 graphically illustrates color L*a*b* coordinates for exemplary binder compositions as the pH of the binder is increased.

FIG. 2 further exemplifies the color change seen in the cured Polyacrylic Acid/Sorbitol/Polyvinyl alcohol ("PAA/S/PVOH") binder composition as the pH increases, compared to a traditional carbohydrate-based binder composition.

In FIG. 2, the color impact was measured using L*a*b* coordinates, which is a test that was modeled after a color-opponent theory stating that two colors cannot be red and green at the same time or yellow and blue at the same time. FIG. 2 illustrates the b* value (measured with a HunterLab MiniScan EZ instrument), which is the yellow/blue coordinate (yellow when positive, blue when negative). A lower number on this scale indicates less yellowing. As shown in FIG. 2, the b* color value decreases dramatically from above 25 at a pH around 2.8 to between 4 and 7 at a pH range of 4.1 to 4.3. This reduction in b* color value indicates that any yellow color in the cured binder is much lighter and closer to white, as the line approaches 0. In various exemplary embodiment, the binder composition achieves a b* color value, using L*a*b* coordinates, of less than 45, such as less than 40, less than 35, less than 30, less than 25, less than 20, less than 15, less than 10, and less than 5.

This pH adjustment may be accomplished with the inclusion of organic and/or inorganic bases in an amount sufficient to adjust the pH to a desired level. In some exemplary embodiments, the base is a non-volatile base. Exemplary organic and/or inorganic bases include sodium hydroxide, ammonium hydroxide, and diethylamine, and any kind of primary, secondary, or tertiary amine (including alkanol amines). Alternatively, or in addition, the pH adjustment may be accomplished by incorporating alkaline reclaim or "wash" water, which may have a pH of 7 to 8.

Accordingly, various aspects of the present application are directed to methods for controlling the color of a cured binder composition by controlling the binder pH. Surprisingly, such an increase in pH has little or no impact on product performance. Such an effect is unexpected, since other polycarboxylic acid and/or carbohydrate-based binder compositions demonstrated the opposite effect, in that increasing the pH 1.0 to 1.5 pH units caused a decrease in performance and increase in undesirable color.

Table 1, below, illustrates the recovery data for low density fiberglass insulation boards prepared using both a binder composition in accordance with the present disclosure (PAA/S/PVOH) and a conventional starch-hybrid binder composition, with varying levels on pH increase. The thickness of each product was measured, compressed for one week, and then released. This was done in both dry (room temperature and 50% relative humidity) and hot/humid (90 F and 90% relative humidity) conditions. The thickness recovery was then measured and shown below, in Table 1. As the pH was increased due to the addition of wash water (WW) or "reclaimed water," the boards formed with the PAA/S/PVOH binder composition demonstrated higher thickness recovery than the boards formed using a conventional starch-hybrid binder composition.

TABLE 1

| | Recovery Data | | | |
|---|---|---|---|---|
| | PAA/S/PVOH | | Starch-hybrid binder | |
| | Dry | Hot/Humid | Dry | Hot/Humid |
| Binder; pH +0.0 | 96% | 93% | 95% | 90% |
| Binder + WW; pH +0.5 | 96% | 94% | 100% | 89% |
| Binder + WW; pH +1.0 | 92% | 91% | 96% | 82% |
| Binder + WW; pH +1.5 | 93% | 91% | 93% | 75% |

When in an un-cured state, the pH of the binder composition may range from 2 to 5, including all amounts and ranges in between. In some exemplary embodiments, the pH of the binder composition, when in an un-cured state, is 2.2-4.0, including 2.5-3.8, and 2.6-3.5. After cure, the pH of the binder composition may rise to at least a pH of 6.0, including levels between 6.5 and 8.5, or between 6.8 and 7.2.

Optionally, the binder may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

In some exemplary embodiments, the aqueous binder composition includes up to 10 wt. % of a dust suppressing agent, including up to 8 wt. %, or up to 6 wt. %. In various exemplary embodiments, the aqueous binder composition includes between 0 wt. % and 10 wt. % of a dust suppressing agent, including 1.0 wt. % to 7.0 wt. %, or 1.5 wt. % to 6.5 wt. %, or 2.0 wt. % to 6.0 wt. %, or 2.5 wt. % to 5.8 wt. %.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise 3% to 35% by weight of binder solids, including without limitation, 10% to 30%, 12% to 20%, and 15% to 19% by weight of binder solids. This level of solids indicates that the subject binder composition may include more water than traditional binder compositions. However, due to the high cure rate of the binder composition, the binder can be processed at a high ramp moisture level (3%-30%) and the binder composition requires less moisture removal than traditional binder compositions. The binder content on a product may be measured as loss on ignition (LOI). In certain embodiments, the LOI on the glass fibers forming an insulation product is 0.5% to 50%, including without limitation, 1% to 25%, 5% to 19%, and 4.5% to 6.0%. In some exemplary embodiments, the binder composition is capable of achieving similar or higher performance than traditional phenolic, starch-based, or starch-hybrid binder compositions with lower LOI.

In some exemplary embodiments, the aqueous binder composition may also include one or more additives, such as a coupling agent, an extender, a crosslinking density enhancer, a deodorant, an antioxidant, a dust suppressing agent, a biocide, a moisture resistant agent, or combinations thereof. Optionally, the binder may comprise, without limitation, dyes, pigments, additional fillers, colorants, UV stabilizers, thermal stabilizers, anti-foaming agents, emulsifiers, preservatives (e.g., sodium benzoate), corrosion inhibitors, and mixtures thereof. Other additives may be added to the binder composition for the improvement of process and product performance. Such additives include lubricants, wetting agents, antistatic agents, and/or water repellent agents. Additives may be present in the binder composition from trace amounts (such as <0.1% by weight the binder composition) up to 10% by weight of the total solids in the binder composition.

In some exemplary embodiments, the aqueous binder composition is substantially free of a monomeric carboxylic acid component. Exemplary monomeric polycarboxylic acid components include aconitic acid, adipic acid, azelaic acid, butane tetra carboxylic acid dihydrate, butane tricarboxylic acid, chlorendic anhydride, citraconic acid, citric acid, dicyclopentadiene-maleic acid adducts, diethylenetriamine pentacetic acid pentasodium salt, adducts of dipentene and maleic anhydride, endomethylenehexachlorophthalic anhydride, ethylenediamine tetraacetic acid (EDTA), fully maleated rosin, maleated tall oil fatty acids, fumaric acid, glutaric acid, isophthalic acid, itaconic acid, maleated rosin-oxidize unsaturation with potassium peroxide to alcohol then carboxylic acid, malic acid, maleic anhydride, mesaconic acid, oxalic acid, phthalic anhydride, polylactic acid, sebacic acid, succinic acid, tartaric acid, terephthalic acid, tetrabromophthalic anhydride, tetrachlorophthalic anhydride, tetrahydrophthalic anhydride, trimellitic anhydride, and trimesic acid.

In various exemplary embodiments, the aqueous binder composition includes a long-chain polyol (e.g., fully or partially hydrolyzed polyvinyl alcohol), a primary crosslinking agent (e.g., polymeric polycarboxylic acid), and a secondary crosslinking agent (e.g. a sugar alcohol). The range of components used in the inventive binder composition according to certain exemplary embodiments is set forth in Table 2.

TABLE 2

| Component | Exemplary Range 1 (% By Weight of Total Solids) | Exemplary Range 2 (% By Weight of Total Solids) |
| --- | --- | --- |
| Long-chain polyol | 5-30 | 10-20 |
| Crosslinking Agent | 50-85 | 65-80 |
| Short-chain polyol | 3-30 | 5-25 |
| Ratio of COOH/OH | 1/0.05-1/5 | 1/0.3-1/2 |
| Ratio long-chain polyol/short-chain polyol | 0.1/0.9-0.9/0.1 | 0.4/0.6-0.6/0.4 |

Aqueous binder compositions according to various exemplary embodiments of the present disclosure may further include a catalyst/accelerator (e.g., sodium hypophosphite), a surfactant, and/or a coupling agent (e.g., silane) are set forth in Table 3.

TABLE 3

| Component | Exemplary Range 1 (% By Weight of Total Solids) | Exemplary Range 2 (% By Weight of Total Solids) |
| --- | --- | --- |
| Long-chain polyol | 5-30 | 10-20 |
| Crosslinking Agent | 50-85 | 65-80 |
| Short-chain polyol | 3-30 | 5-25 |
| Catalyst | 1.0-5.0 | 2.0-4.0 |
| Coupling agent | 0.1-2.0 | 0.15-0.8 |
| Surfactant | 0.01-5.0 | 0.1-1.0 |

In some exemplary embodiments, the binder composition is formulated to have a reduced level of water soluble material post-cure as determined by extracting water-soluble materials with deionized water for 2 hours at room temperature using 1000 g of deionized water per 1 gram of binder. The higher the level of water soluble material after cure, the more likely it is that a cured material suffers from leaching if/when exposed to water and/or a hot/humid environment. In some exemplary embodiments, the binder composition has no greater than 6 wt. % of water soluble material after cure. In some exemplary embodiments, the binder composition has less than 5.0 wt. % water soluble material after cure, including less than 5.0 wt. %, 4.0 wt. %, 3.0 wt. %, less than 2.5 wt. %, less than 2.0 wt. %, less than 1.5 wt. %, or less than 1.0 wt. %. It has been discovered that reducing the level of water soluble material after cure to no greater than 6.0 wt. %, will improve the tensile strength of the binder composition, as compared to an otherwise similar binder composition having greater than 6.0 wt. %, water soluble material after cure.

The amount of water soluble material remaining in the binder composition after cure may be determined at least in part by the amount of carboxylic acid groups in the binder. Particularly, excess acid groups increase the water-soluble content leads to an increase in water soluble material post-cure. As shown in Table 4, below, Comparative Examples 1 and 2 have COOH/OH ratios that are highly acidic, resulting in an unacceptably high percentage of water soluble material after cure. In contrast, the percentage of water soluble material remaining after cure decreases substantially at COOH/OH ratios of 1/0.1 or less.

TABLE 4

| # | PAA | Sorbitol | PVOH | Ambient Tensile/LOI | Hot/humid tensile/LOI | Water soluble % | Set point ratio |
| --- | --- | --- | --- | --- | --- | --- | --- |
| Comp. Ex. 1 | 52.17% | 0 | 47.83% | 37.9 | 38.3 | 4.90% | COOH/OH = 1/1.5 (P/S = 1/0) |
| Comp. Ex. 2 | 95.96% | 0 | 4.04% | 38.0 | 32.0 | 51.7% | COOH/OH = 1/0.07(P/S = 1/0) |
| Comp. Ex. 3 | 61.28% | 38.72% | 0 | 39.7 | 40.4 | 6.5% | COOH/OH = 1/1.5(P/S = 0/1) |
| Comp. Ex. 4 | 95.96% | 4.04% | 0 | 44.3 | 38.7 | 15.9% | COOH/OH = 1/0.1(P/S = 0/1) |
| A | 61.84% | 27.51% | 10.65% | 39.1 | 37.4 | 1.5% | COOH/OH = 1/1.34(P/S = 0.21/0.79) |
| B | 61.84% | 8.15% | 30.01% | 39.5 | 38.8 | 2.6% | COOH/OH = 1/1.11 (P/S = 0.72/0.28) |
| C | 66.39% | 27.51% | 6.10% | 39.8 | 39.6 | 1.9% | COOH/OH = 1/1.13(P/S = 0.13/0.87) |
| D | 83.73% | 10.17% | 6.10% | 40.8 | 33.5 | 3.4% | COOH/OH = 1/0.41(P/S = 0.29/0.71) |
| E | 71.51% | 16.30% | 12.20% | 40.0 | 38.8 | 4.6% | COOH/OH = 1/0.82(P/S = 0.34/0.66) |
| F | 52.17% | 38.72% | 9.11% | 41.2 | 39.4 | 8.1% | COOH/OH = 1/2.05(P/S = 0.14/0.86) |

TABLE 4-continued

| # | PAA | Sorbitol | PVOH | Ambient Tensile/ LOI | Hot/humid tensile/ LOI | Water soluble % | Set point ratio |
|---|-----|----------|------|----------------------|------------------------|-----------------|-----------------|
| G | 83.73% | 8.15% | 8.12% | 45.4 | 38.4 | 5.7% | COOH/OH = 1/0.39(P/S = 0.41/0.59) |
| H | 91.52% | 0 | 0.84% | 32.09 | 26.29 | 93.4% | COOH/OH = 1/0.02(P/S = 1/0) |

It has further been discovered that the total polyol content should contain at least 10 wt. % of one or more short-chain polyols to produce a binder composition with an acceptably low level (e.g., no greater than 6 wt. %) of water soluble material after cure. This is particularly surprising since generally, short-chain polyols, such as sorbitol, have high water solubility. Thus, it would be expected that increasing the level of sorbitol would increase the amount of water soluble material in the binder composition.

In some exemplary embodiments, the binder composition has a viscosity of less than 400 cP at 30% solids or less, including less than 300 cP at 30% solids or less, and less than 200 cP at 30% solids or less. In various exemplary embodiments, the viscosity of the binder composition is no greater than 175 cP at 30% solids or less.

As described above, the formaldehyde-free aqueous binder composition described herein is used to manufacture low and heavy density fibrous insulation products that have comparable or improved mechanical and physical performance, compared to products manufactured with traditional formaldehyde-based binder compositions.

In some exemplary embodiments, the fiberglass insulation mat is Red List-free, meaning that the mat is free of chemicals contained in the Red-List, defined at https://living-future.org/declare/declare-about/red-list/. Particularly, the fiberglass insulation mat is free of any added formaldehyde.

The fibrous insulation products may comprise fibers with any diameter size and length. In some exemplary embodiments, the fibrous insulation products comprise glass fibers having a fiber diameter between 5 HT and 80 HT.

The binder content on cured fibrous insulation products may be measured as loss on ignition (LOI). In certain embodiments, LOI of the binder composition on the fiberglass insulation products is between 2.5% to 20%, including without limitation, between 4% to 17%, 5% to 15%, and 5.5% to 14.5%.

In some exemplary embodiments, the fibrous insulation products include ceiling boards. In some exemplary embodiments, the ceiling board has a density between 1 pcf to 12 pcf and comprises glass fibers with a diameter between 35 and 50 HT (hundred thousands), including between 40 and 46 HT. The ceiling boards may have an LOI of less than 15%, such as less than 13%, less than 11% and less than 10.55%.

In some exemplary embodiments, the manufactured ceiling boards pass one or more of the ASTM tests for fire resistance (ASTM E84), odor emission (ASTM C 1304—odor rating of 3.5 or less), fungi resistance (ASTM C 1338—no mold growth), and corrosion resistance (ASTM C665—no corrosion in excess of that from sterile cotton; and ASTM C 1617—not to exceed 5 ppm chloride solution). With regard to fire resistance, the manufactured ceiling boards not only pass the ASTM E84 board surface burning requirement for a flame spread of no greater than 15, but in some embodiments, the ceiling boards demonstrated a flame spread of no greater than 10, no greater than 5, no greater than 2, and no greater than zero flame spread. Additionally, there was no smoke development under this test.

In some exemplary embodiments, the manufactured ceiling boards have a water vapor sorption of no greater than 5% maximum by weight, according to ASTM C 1104, including no greater than 4% maximum by weight, no greater than 3% maximum by weight, and no greater than 2% maximum by weight.

In some exemplary embodiments, the manufactured ceiling boards have a finished ceiling tile sag and delamination under ambient or hot/humid conditions (4×4) of less than 0.3" and less than 50% delamination of the board. In some embodiments, the ceiling boards have a finished ceiling tile sag and delamination under ambient or hot/humid conditions of less than 0.2" and essentially no delamination of the board, according to AWI sag test.

The manufactured ceiling boards further do not exhibit leaching when wet, meaning that the board does not create a stain on a product to which it is applied. Water extract from the wet ceiling boards is essentially clear or colorless.

The manufactured ceiling boards exhibit less dust on equipment during production, as compared to an otherwise comparable board made with formaldehyde or starch-based binder compositions. Dust production may be measured by vacuuming a piece of board and weighing the dust collected in the vacuum filter.

In some exemplary embodiments, the fibrous insulation products include duct products, such as duct board. In some exemplary embodiments, the fibrous insulation product is a duct board comprising a rigid, resin bonded fiberglass insulation mat. In some exemplary embodiments, the duct board fiberglass insulation mat comprises glass fibers with a diameter between 20 and 80 HT, including between 25 and 78 HT.

In some exemplary embodiments, the fiberglass insulation mat has a density between 2.0 and 6.0 lbs/ft$^3$, including between 3.2 and 5.3 lbs/ft$^3$, 3.9 and 4.45 lbs/ft$^3$, and all combinations of density ranges therebetween.

In some exemplary embodiments, the duct board fiberglass insulation mat has a thickness between 0.5 and 5 inches, including between 1.0 and 3.0 inches, and all combinations of thickness ranges therebetween.

In some exemplary embodiments, the duct board fiberglass insulation mat has a loss on ignition (LOI) up to 20%, including up to 19%, and up to 18%.

In some exemplary embodiments, a first major surface of the duct board fiberglass insulation mat has a facer adhered thereon. The facer may be any type of facer, such as a coated fiber mat facer, a foil-scrim-kraft (FSK) facer, and the like. An FSK facer is a layered facer comprising an aluminum foil/fiberglass scrim/Kraft lamination configuration. The facer may be adhered on the outward-facing, exposed surface of the duct board. In some exemplary embodiments, the facer is adhered to the bottom surface of the fiberglass insulation mat with an adhesive. The adhesive may be a pre-applied polymer film or asphalt adhesive.

In some exemplary embodiments, a second major surface of the fiberglass insulation mat has a veil adhered thereon, such as a fiberglass veil. The veil may be adhered to the top or the bottom surface or the fiberglass insulation mat. In some exemplary embodiments, the veil comprises a black veil, which comprises a fiberglass mat formed with glass fibers having diameters between 10 and 15 microns. These fibers are then coated with a binder composition comprising an acrylic to form a fiberglass mat that can then pass to an impregnation station and be impregnated with a coating composition that includes carbon black, acrylic binder, and a flame retardant, in addition to some other additives. It is possible that the veil is applied to the top surface of the fiberglass insulation mat, prior to passing the duct board through a drying oven. In some exemplary embodiments, the veil is adhered to the bottom surface of the fiberglass insulation mat with an adhesive. The adhesive may be a pre-applied polymer film or asphalt adhesive.

In some exemplary embodiments, duct board products formed in accordance with the subject invention demonstrates equal or better properties than duct board products formed from fiberglass insulation mats formed using conventional starch-based or phenolic binder compositions. For example, duct boards formed in accordance with the subject invention demonstrate equal or better compressive strength, flexural rigidity, sag and delamination resistance, facing adhesion, and air stream surface adhesion.

In some exemplary embodiments, the fibrous insulation products include low or "light" density fibrous insulation products, such as insulation batts and blankets. Such low-density insulation products typically have densities between 0.1 square foot weight (SFW) to 0.56 square foot weight (SFW) (or 0.1 pounds/cubic foot ("pcf") and 2.5 pcf). In some exemplary embodiments, the low-density fibrous insulation products comprise glass fibers with a diameter between 2 and 30 HT, including between 5 and 25 HT.

Figure 18:
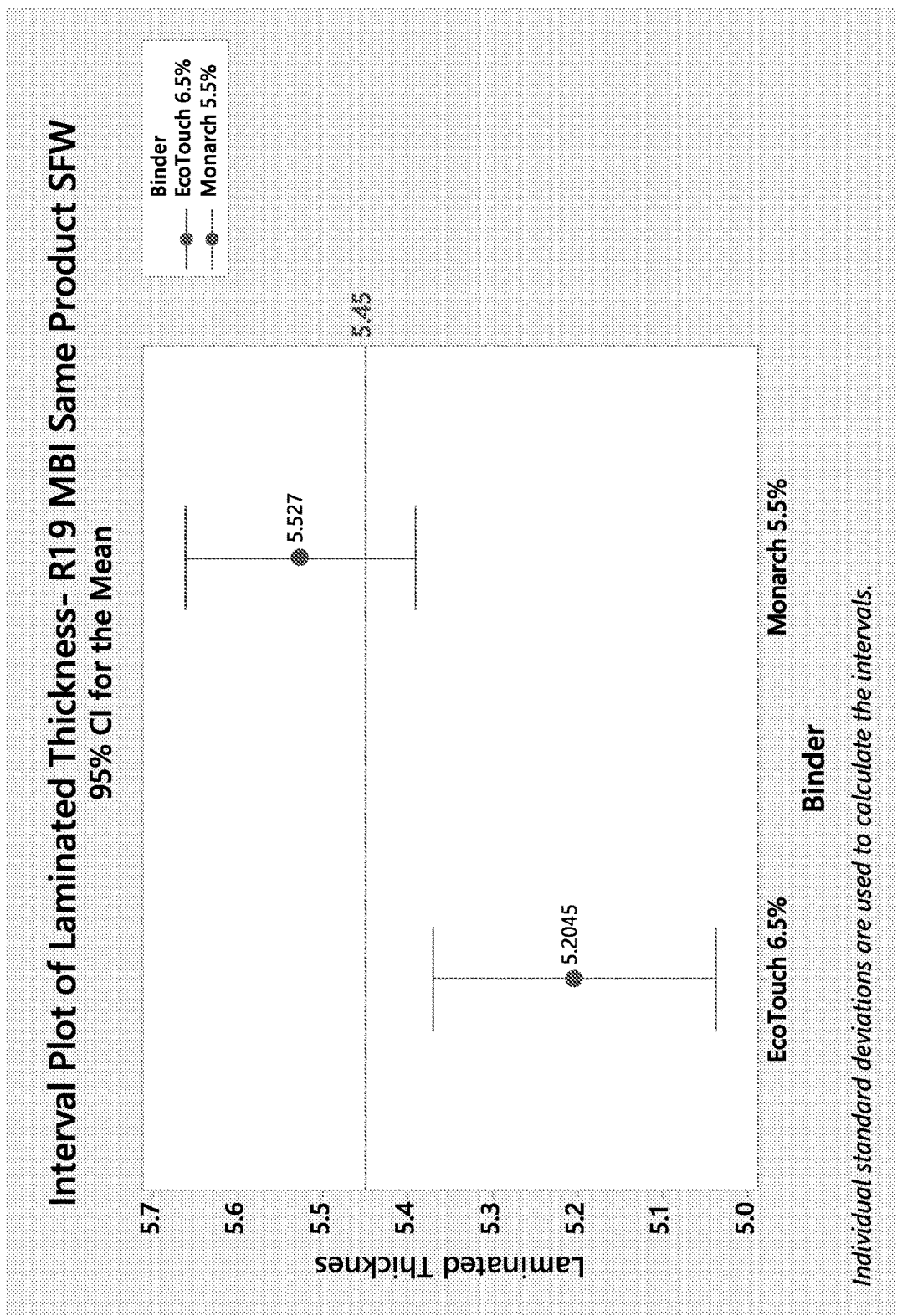
FIG. 18 graphically illustrates the laminated thickness profiles for low-density fibrous insulation products formed using a binder composition in accordance with the subject application, compared to a low-density fibrous insulation product formed using a conventional starch-based binder composition.
Figure 19:
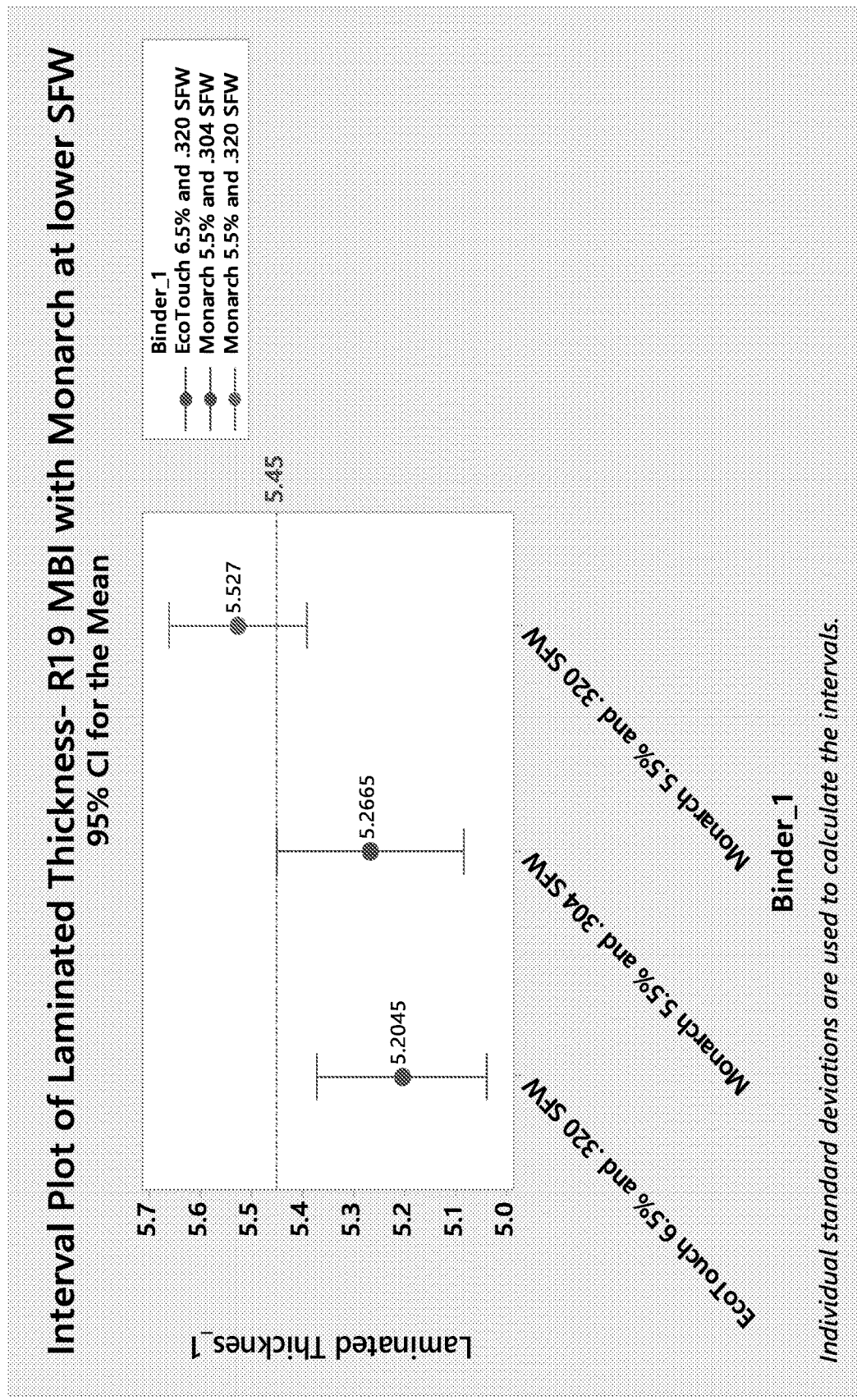
FIG. 19 graphically illustrates the laminated thickness profiles for low-density fibrous insulation products formed using binder compositions in accordance with the subject application, compared to a low-density fibrous insulation product formed using a conventional starch-based binder composition.
Figure 20:
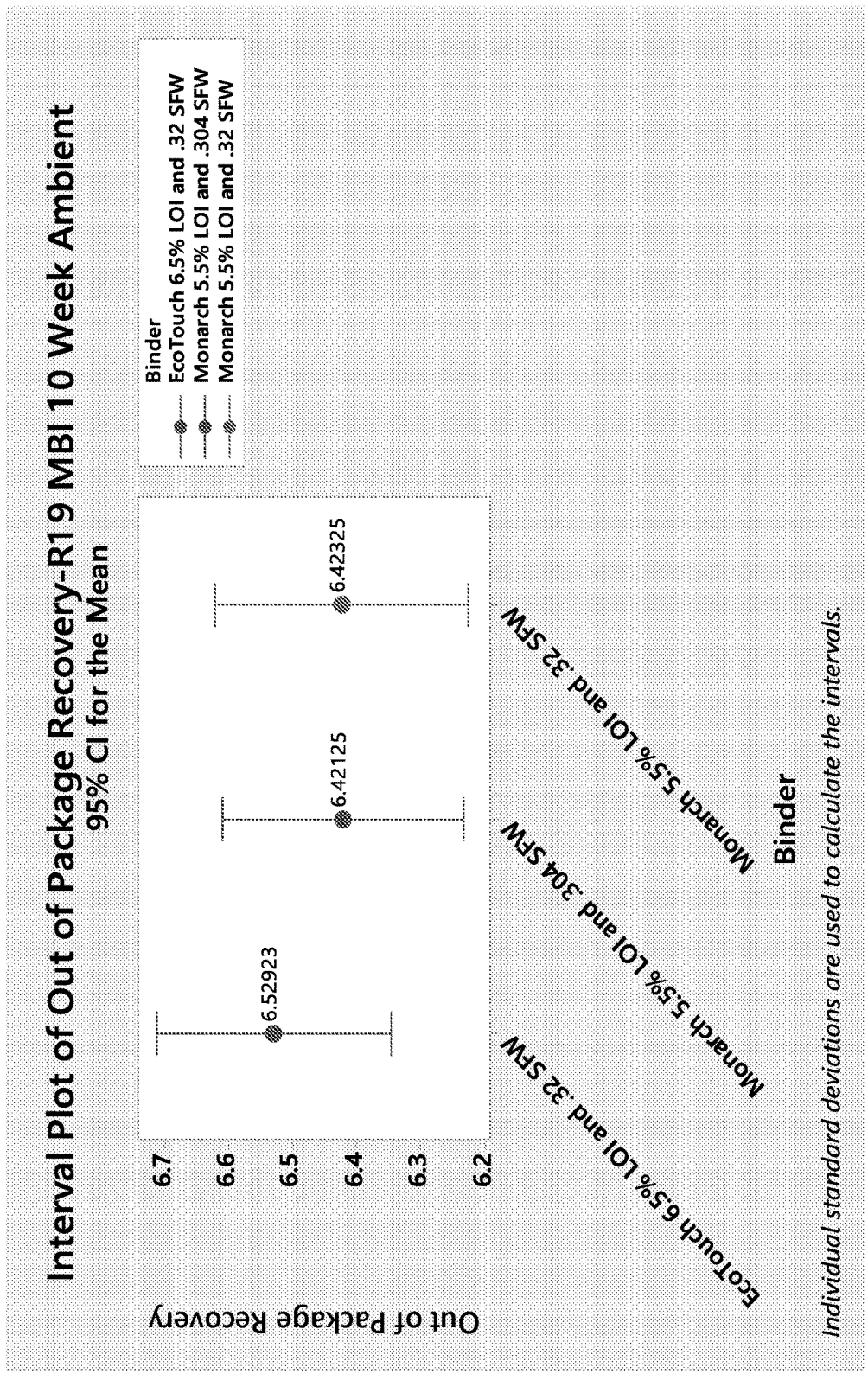
FIG. 20 graphically illustrates the out of package recovery profiles for low-density fibrous insulation products formed using binder compositions in accordance with the subject application, compared to a low-density fibrous insulation product formed using a conventional starch-based binder composition.

In some exemplary embodiments, low density fibrous insulation products formed in accordance with the subject invention demonstrate improved properties compared to otherwise comparable fibrous insulation products formed using conventional starch-based binder compositions, while utilizing a lower binder LOI. Thus, insulation products formed with the subject binder composition require the use of less binder composition, while still improving product properties. For instance, low density fibrous insulation products formed in accordance with the subject invention at 5.5% LOI demonstrate better out of package recovery and post-laminated recovery compared to an otherwise comparable insulation product formed using a conventional starch-based binder composition at 6.5% LOI. (See, FIG. 18). Additionally, at 5.5% LOI and a 5%-10% reduction in product square foot weight has comparable or better out of package recovery and post-laminated recovery than an otherwise comparable insulation product formed using a conventional starch-based binder composition at 6.5% LOI and standard square foot weight. For instance, fibrous insulation products formed with a binder composition of the subject application at 5.5% LOI and an SFW of 0.304 has comparable to better product properties than an otherwise comparable insulation product formed using a conventional starch-based binder composition at 6.5% LOI and a 0.320 SFW. (See FIGS. 19 and 20). Additionally, fibrous insulation products formed with a binder composition of the subject application at 5.5%-6.0% LOI and an SFW of 0.161 has comparable to better product out of package recovery than an otherwise comparable insulation product formed using a conventional starch-based binder composition at 6.5% LOI and a 0.183 SFW. (See, FIG. 20).

Figure 21:
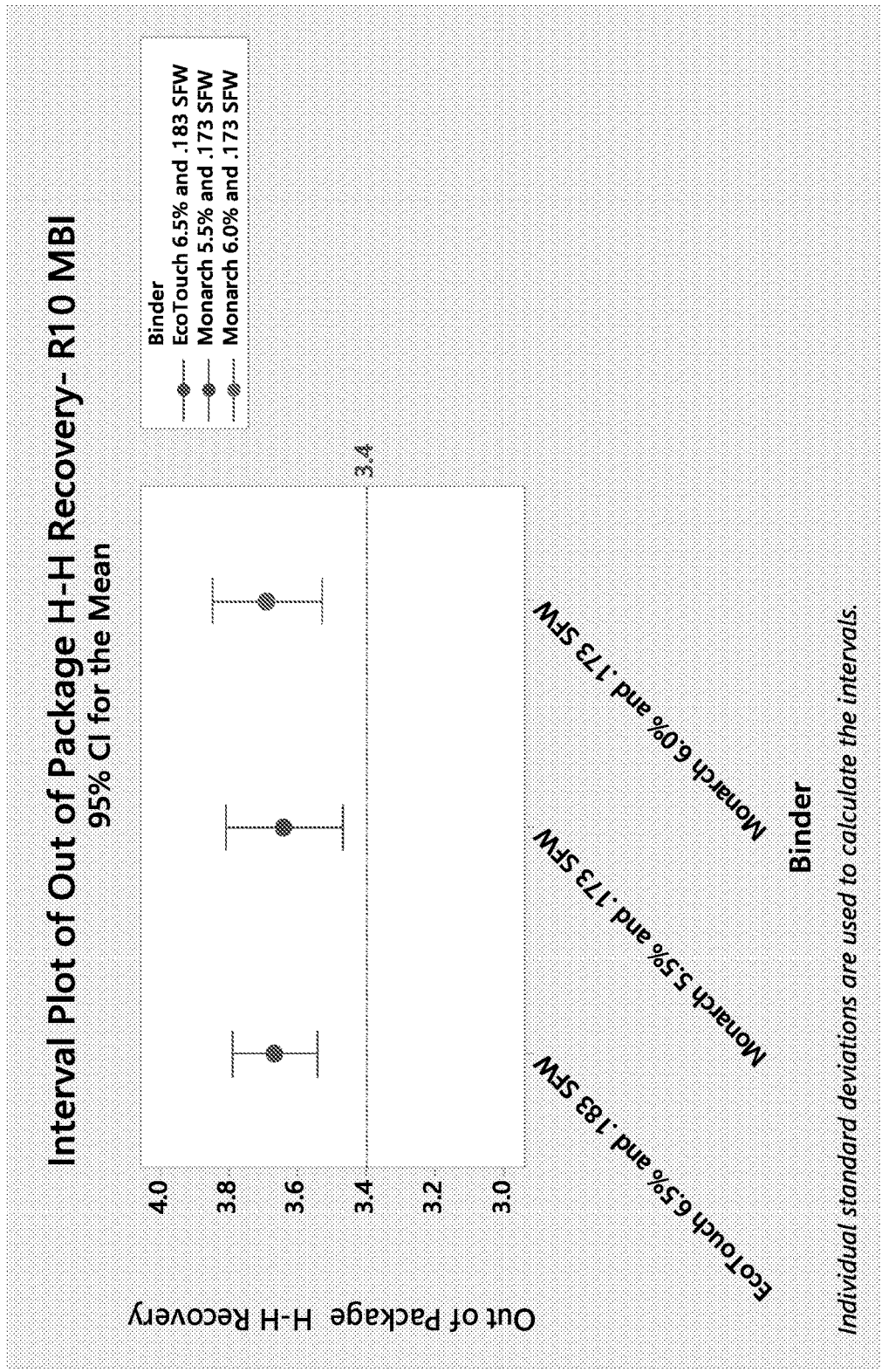
FIGS. 21 and 22 graphically illustrate the out of package recovery profiles for low-density fibrous insulation products formed using binder compositions in accordance with the subject application under hot-humid conditions, compared to a low-density fibrous insulation product formed using a conventional starch-based binder composition.
Figure 22:
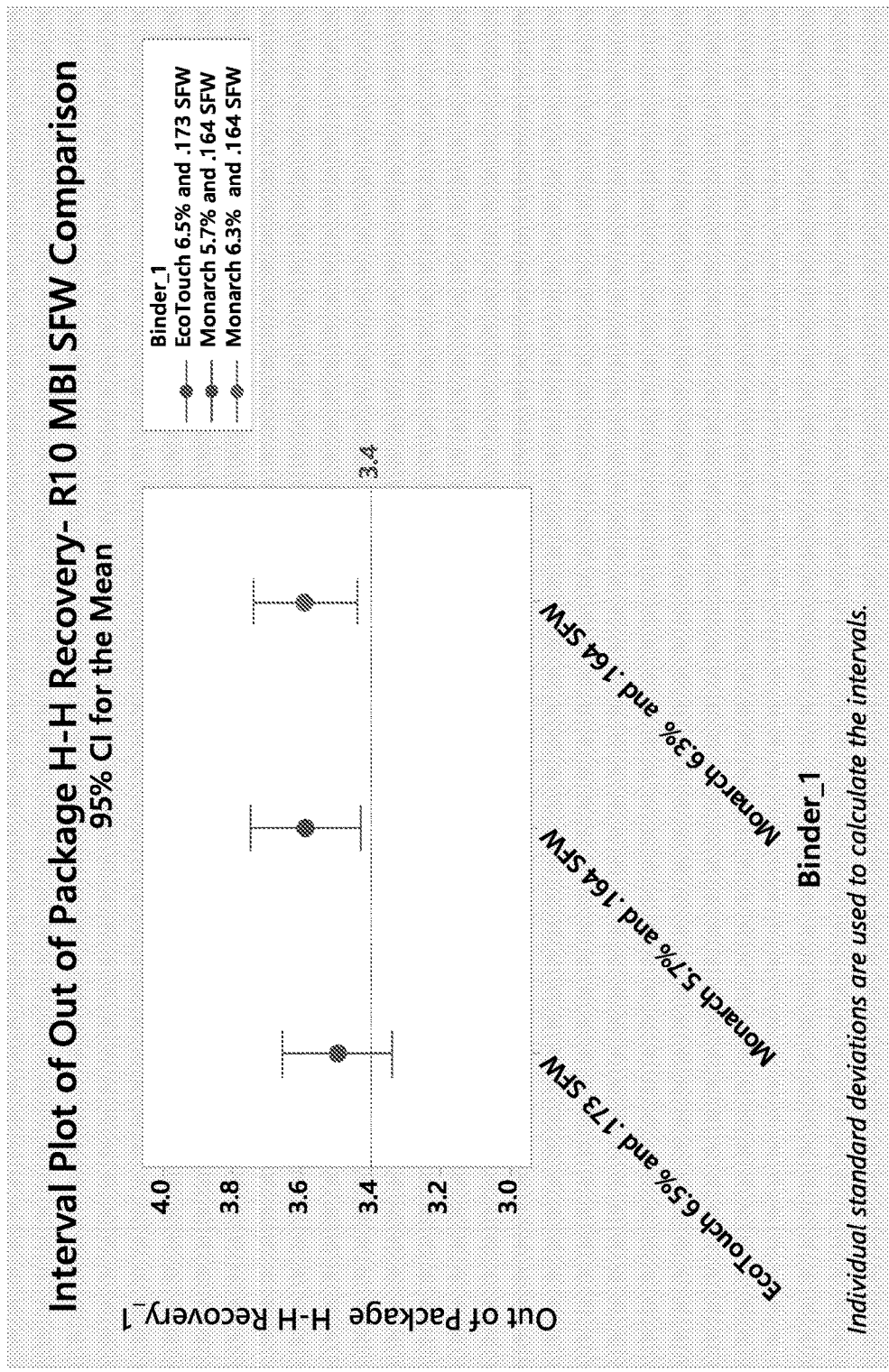

Similar recovery performance improvements can be seen when insulation rolls are subjected to hot-humid conditions (4 days at 96° F. and 54% relative humidity). (See, FIGS. 21 and 22).

Additionally, low density fibrous insulation products formed in accordance with the subject invention demonstrate better tensile strength, recovery, and stiffness than otherwise comparable insulation products formed using a conventional starch-based binder composition.

Having generally described this invention, a further understanding can be obtained by reference to certain specific examples illustrated below which are provided for purposes of illustration only and are not intended to be all inclusive or limiting unless otherwise specified.

EXAMPLE 1

Binder formulations with varying carboxylic acid/hydroxyl ratios and varying polyvinyl alcohol/sorbitol ratios were utilized to form thin boards (425° F. cure temp and 0.125-inch thickness) that were cut into strips. These ratios are depicted below in Table 5. Each board strip was subjected to a 3-point bend test, wherein a load was placed in the middle of each strip and the amount of load the board strip was able to withstand prior to break was measured. The results are depicted in FIG. 3.

TABLE 5

| Sample | COOH/OH ratio | PVOH/Sorbitol ratio |
|---|---|---|
| 1a | 1/0.1 | 0.1/0.9 |
| 1b | 1/0.1 | 0.5/0.5 |
| 1c | 1/0.1 | 0.9/0.1 |
| 2a | 1/0.66 | 0.1/0.9 |
| 2b | 1/0.66 | 0.5/0.5 |
| 2c | 1/0.66 | 0.9/0.1 |
| 3a | 1/1.5 | 0.1/0.9 |
| 3b | 1/1.5 | 0.5/0.5 |
| 3c | 1/1.5 | 0.9/0.1 |

Figure 3:
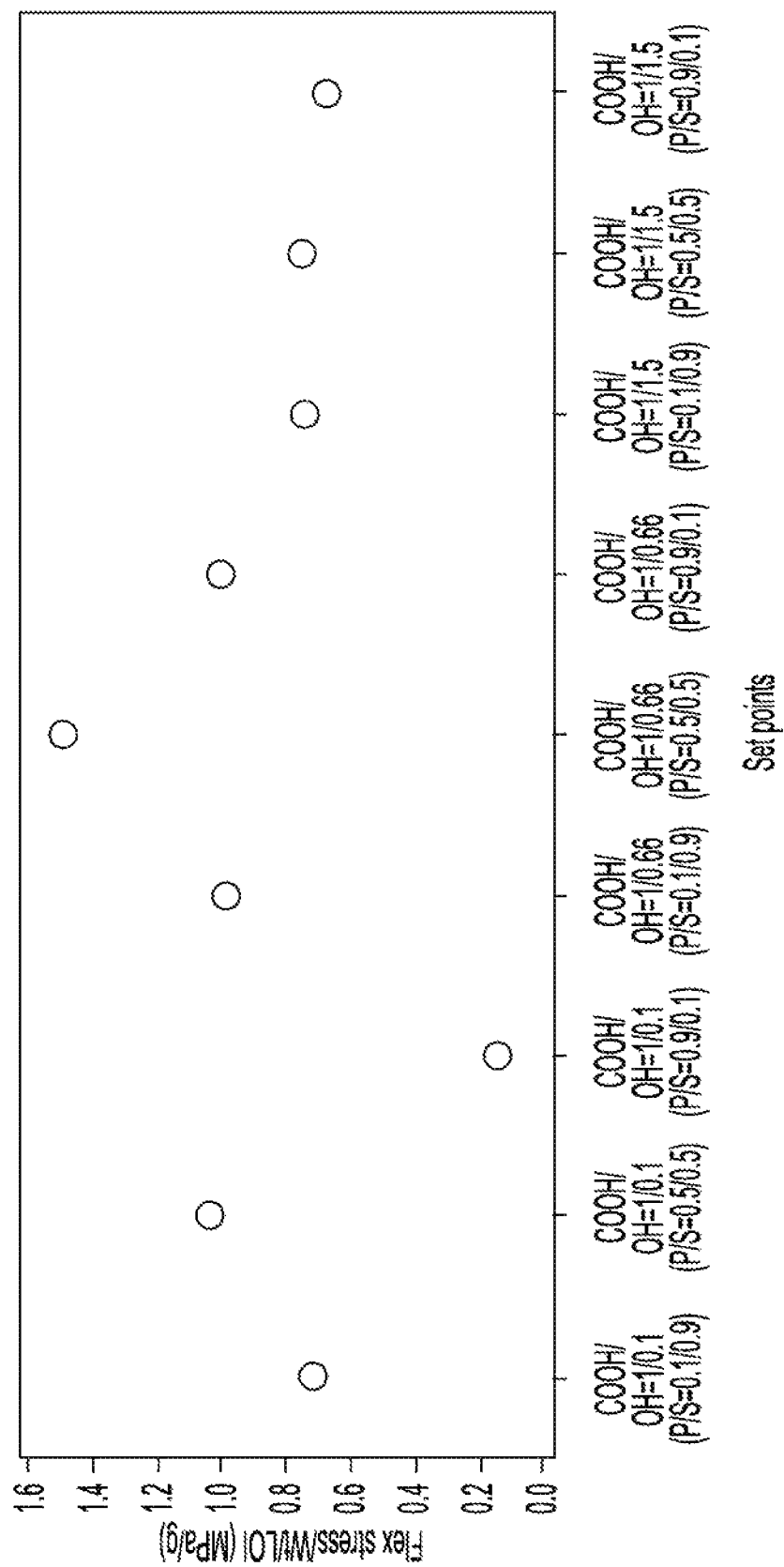
FIG. 3 graphically illustrates the flexural stress/wt./LOI for fiberglass insulation made with exemplary cured binder compositions having varying ratios of molar equivalent carboxylic acid groups/hydroxyl groups and long-chain polyol/short-chain polyol.

As illustrated in FIG. 3, within each carboxylic acid/hydroxyl group ratio, the flex stress/weight/LOI increased or decreased depending on the polyvinyl alcohol/sorbitol ratio. Flex stress is a three-point bend test (i.e., force until breakage) utilizing a 2"×6" board with a ⅛" thickness. The highest flex stress/LOI overall was achieved when the carboxylic acid/hydroxyl group ratio was 1/0.66. Moreover, within this ratio, the flex stress/LOI was further increased when the polyvinyl alcohol/sorbitol ratio was 0.5/0.5. In fact, a polyvinyl alcohol/sorbitol ratio of 0.5/0.5 demonstrated the highest flex stress within each set of carboxylic acid/hydroxyl group ratios.

Figure 4:
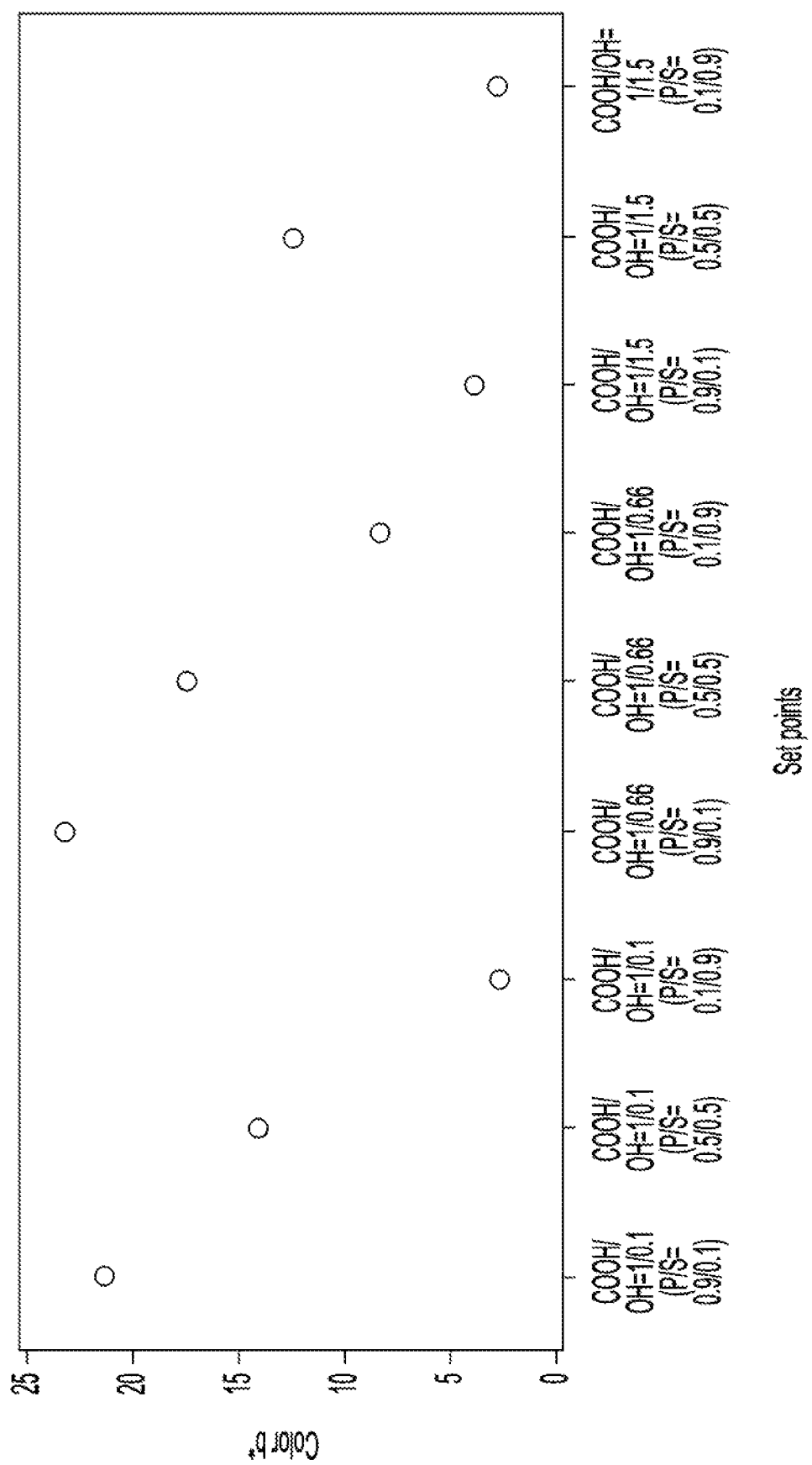
FIG. 4 graphically illustrates the color b* value for fiberglass insulation made with exemplary cured binder compositions having varying ratios of molar equivalent carboxylic acid groups/hydroxyl groups and long-chain polyol/short-chain polyol.

The samples were further tested for color impact using L*a*b* coordinates, which is a test that was modeled after a color-opponent theory stating that two colors cannot be red and green at the same time or yellow and blue at the same time. FIG. 4 illustrates the b* value, which is the yellow/blue coordinate (yellow when positive, blue when negative). A lower number on this scale indicates less yellowing. As shown in FIG. 4, compositions that included less long-chain polyol (in this case PVOH) demonstrated less yellowing and an overall improvement in color.

EXAMPLE 2

Binder compositions with varying COOH/OH and long-chain polyol/short-chain polyol ratios were utilized to form non-woven fiberglass binder impregnated filter (BIF) sheets having a width of 9.5 mm, thickness of 0.5 mm, and a length of 97 mm. The non-woven fiberglass BIF sheets were cured for 3 minutes and 30 seconds at 425° F. The tensile strength, the Loss on Ignition (LOI), tensile strength divided by the LOI (tensile strength/LOI), and b* color value for each sample was determined under ambient conditions and steam ("hot/humid") conditions. The tensile strength was measured using Instron (Pulling speed of 2 inches/min). The LOI of the reinforcing fibers is the reduction in weight experienced by the fibers after heating them to a temperature sufficient to burn or pyrolyze the binder composition from the fibers. The LOI was measured according to the procedure set forth in TAPPI T-1013 OM06, Loss on Ignition of Fiberglass Mats (2006). To create the hot/humid environment, the filter sheets were placed in an autoclave at 240° F. at a pressure between 400 and 500 psi for 60 minutes.

Figure 5:
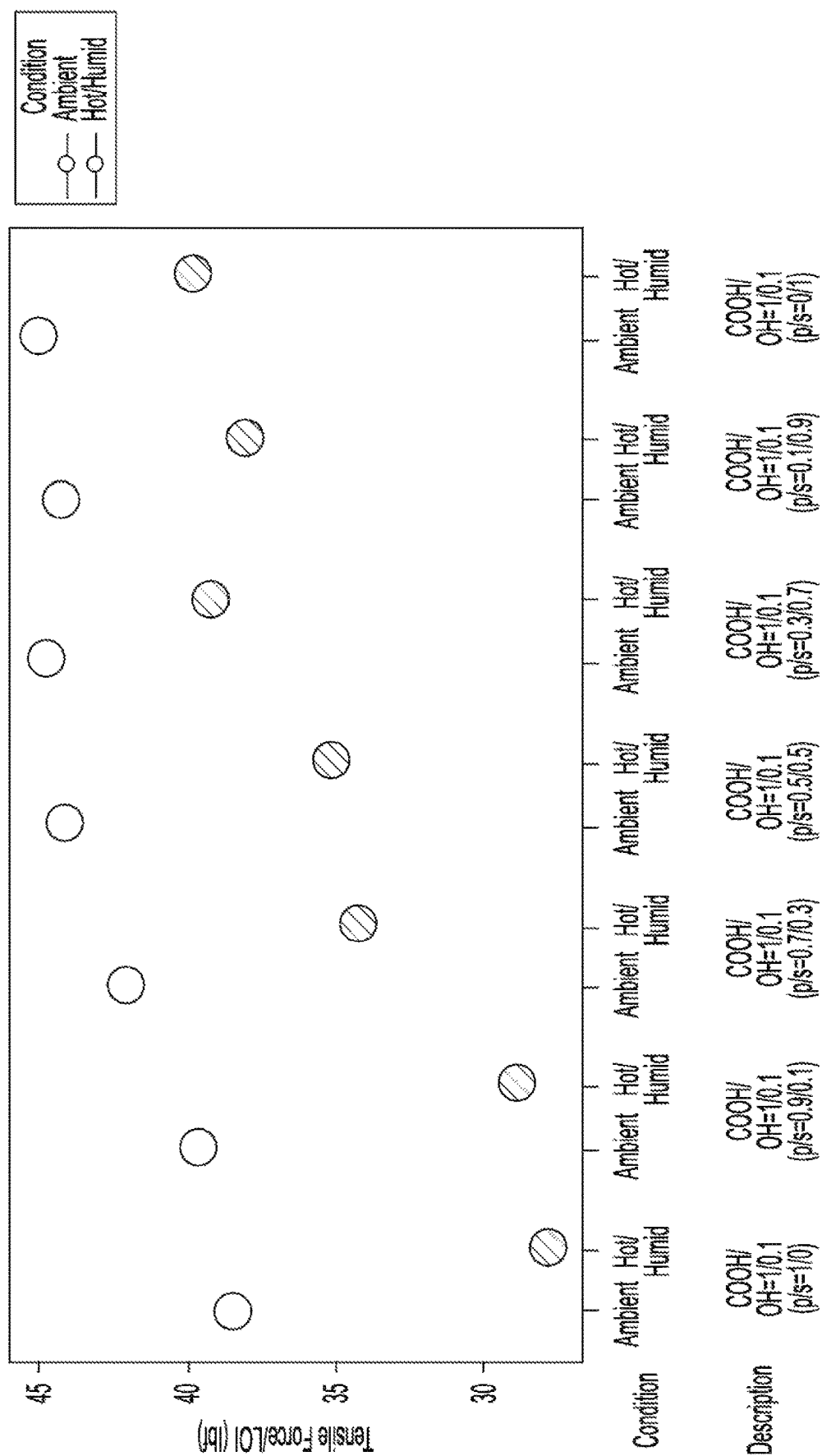
FIG. 5 graphically illustrates the tensile force/LOI for fiberglass made with exemplary binder compositions having a ratio of molar equivalent carboxylic acid groups/hydroxyl groups of 1/0.1 and varying long-chain polyol/short-chain polyol ratios.
Figure 6:
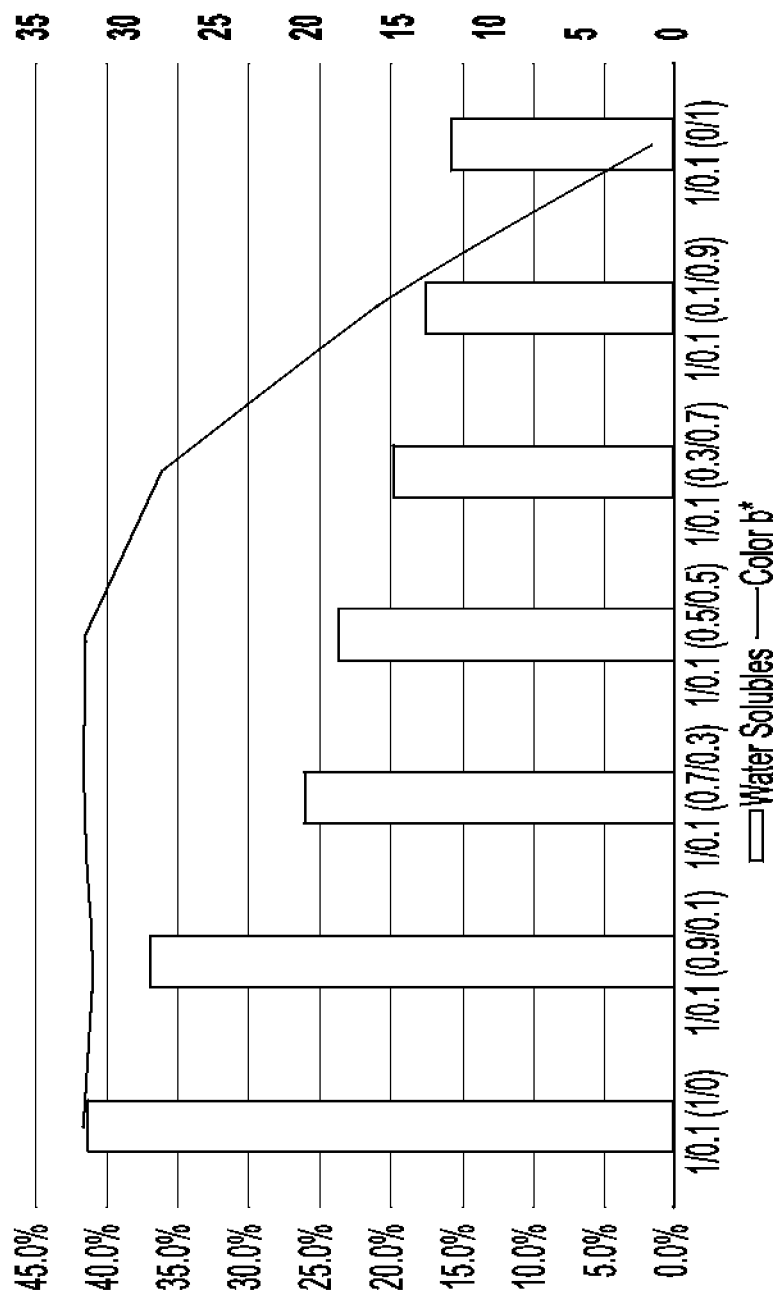
FIG. 6 graphically illustrates both the % water soluble material post-cure and color b* value for exemplary binder compositions having a ratio of molar equivalent carboxylic acid groups/hydroxyl groups of 1/0.1 and varying long-chain polyol/short-chain polyol ratios.

As illustrated in FIG. 5, the tensile/LOI appeared to generally increase in both ambient and hot/humid conditions when the ratio of short-chain polyol in the composition was increased (within a COOH/OH ratio of 1/0.1). This relationship appears consistent with the level of water soubles remaining in the composition after cure. (FIG. 6). FIG. 6 illustrates that as the ratio of short-chain polyol increases, the percentage of water soluble materials in the composition after cure decreases. Notably, the b* color value also decreases with increases short-chain polyol ratio.

Figure 7:
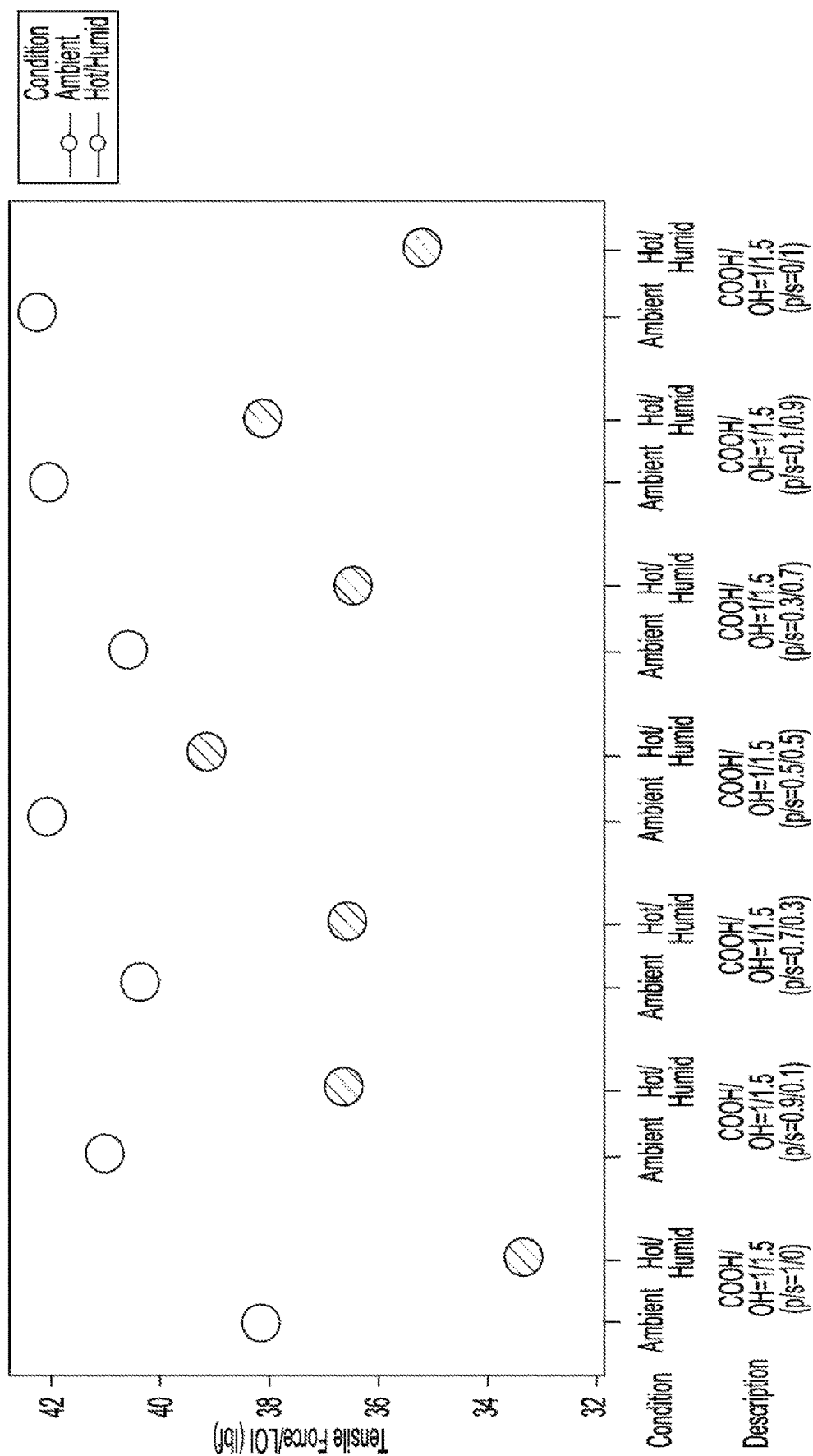
FIG. 7 graphically illustrates the tensile force/LOI for exemplary cured binder compositions having a ratio of molar equivalent carboxylic acid groups/hydroxyl groups of 1/1.5 and varying long-chain polyol/short-chain polyol ratios.
Figure 8:
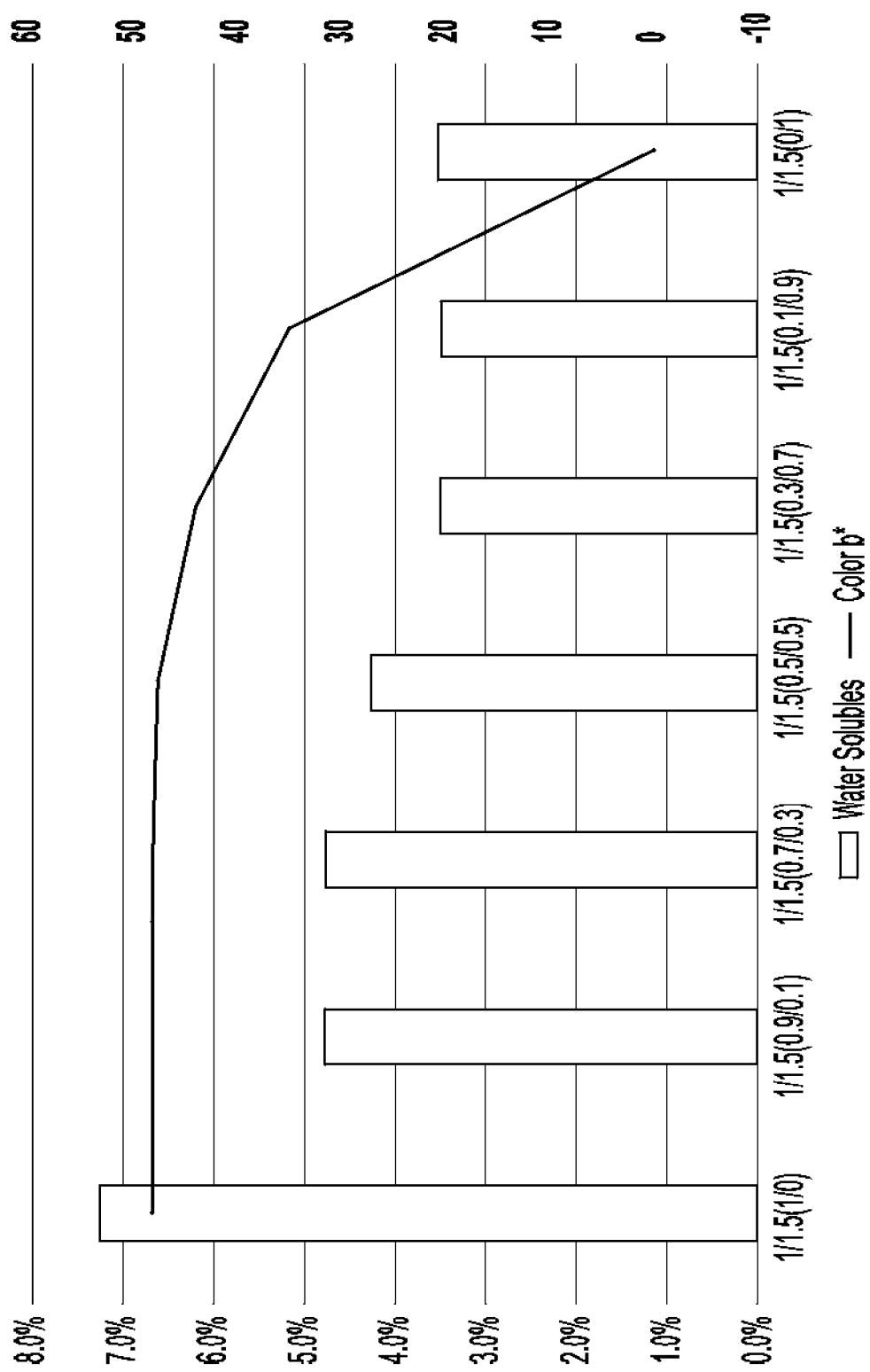
FIG. 8 graphically illustrates both the % water soluble material post-cure and color b* value for exemplary binder compositions having a ratio of molar equivalent carboxylic acid groups/hydroxyl groups of 1/1.5 and varying long-chain polyol/short-chain polyol ratios.
Figure 9:
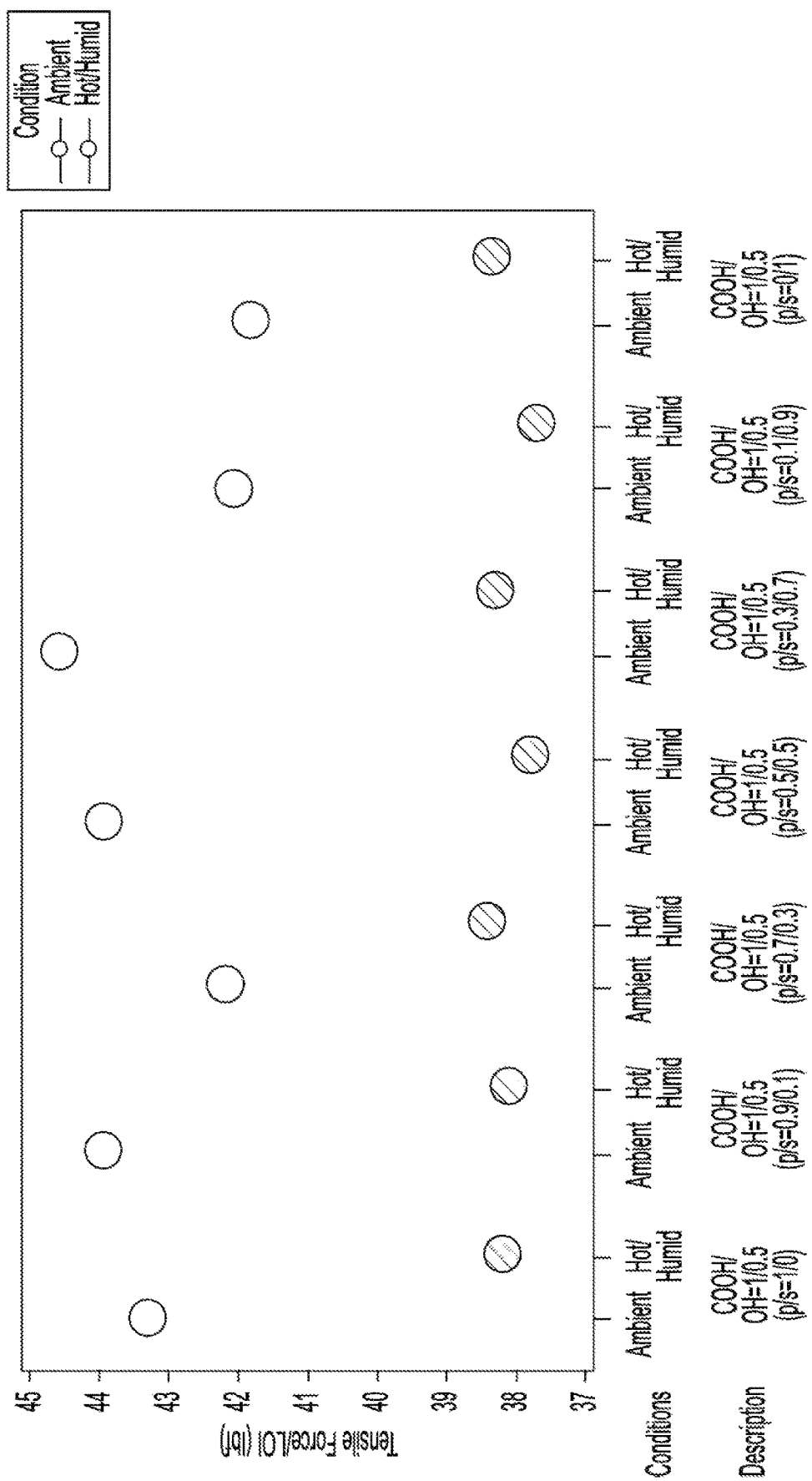
FIG. 9 graphically illustrates the tensile force/LOI for exemplary cured binder compositions having a ratio of molar equivalent carboxylic acid groups/hydroxyl groups of 1/0.5 and varying long-chain polyol/short-chain polyol ratios.
Figure 10:
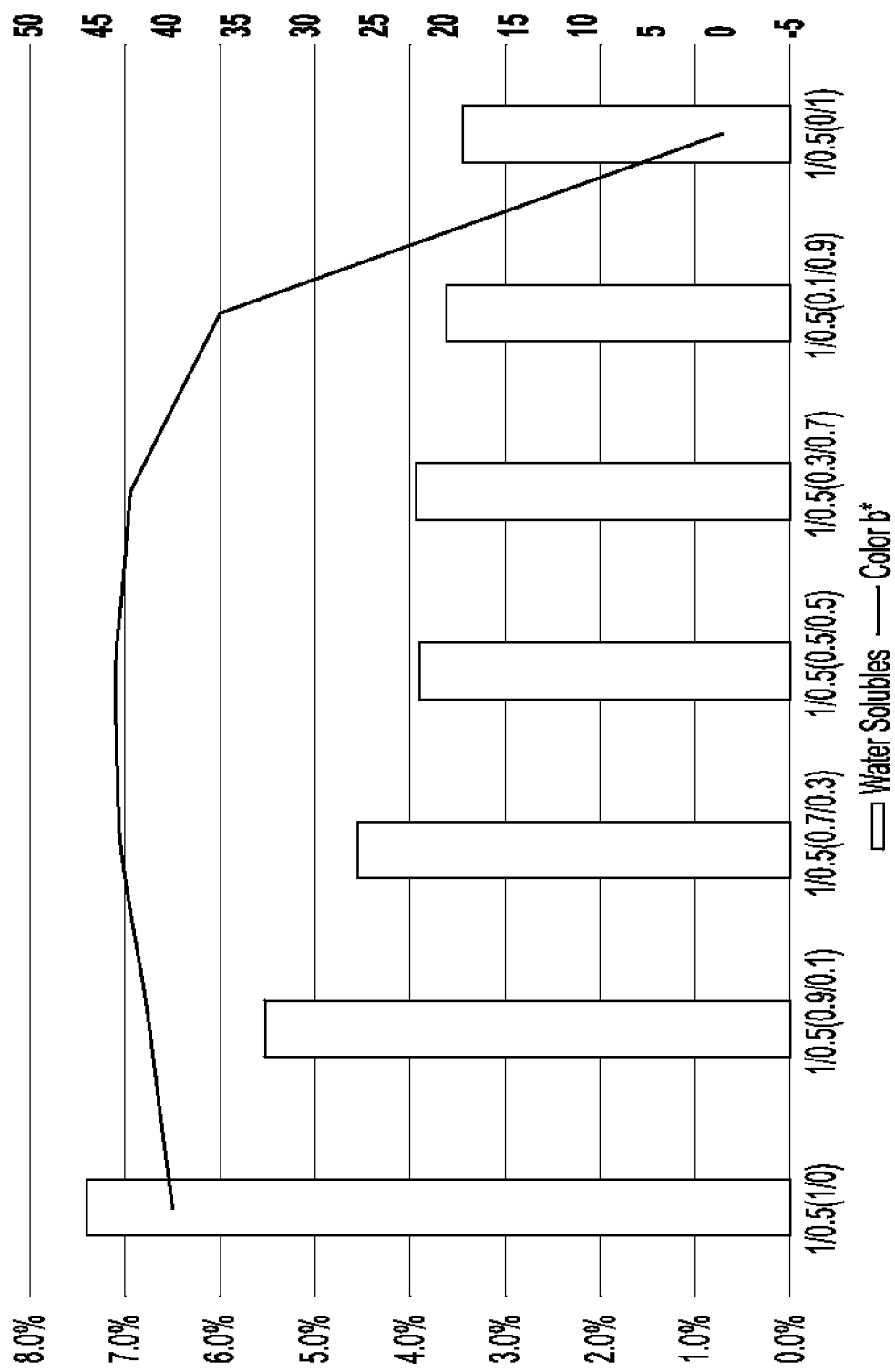
FIG. 10 graphically illustrates both the % water soluble material post-cure and color b* value for exemplary binder compositions having a ratio of molar equivalent carboxylic acid groups/hydroxyl groups of 1/0.5 and varying long-chain polyol/short-chain polyol ratios.
Figure 11:
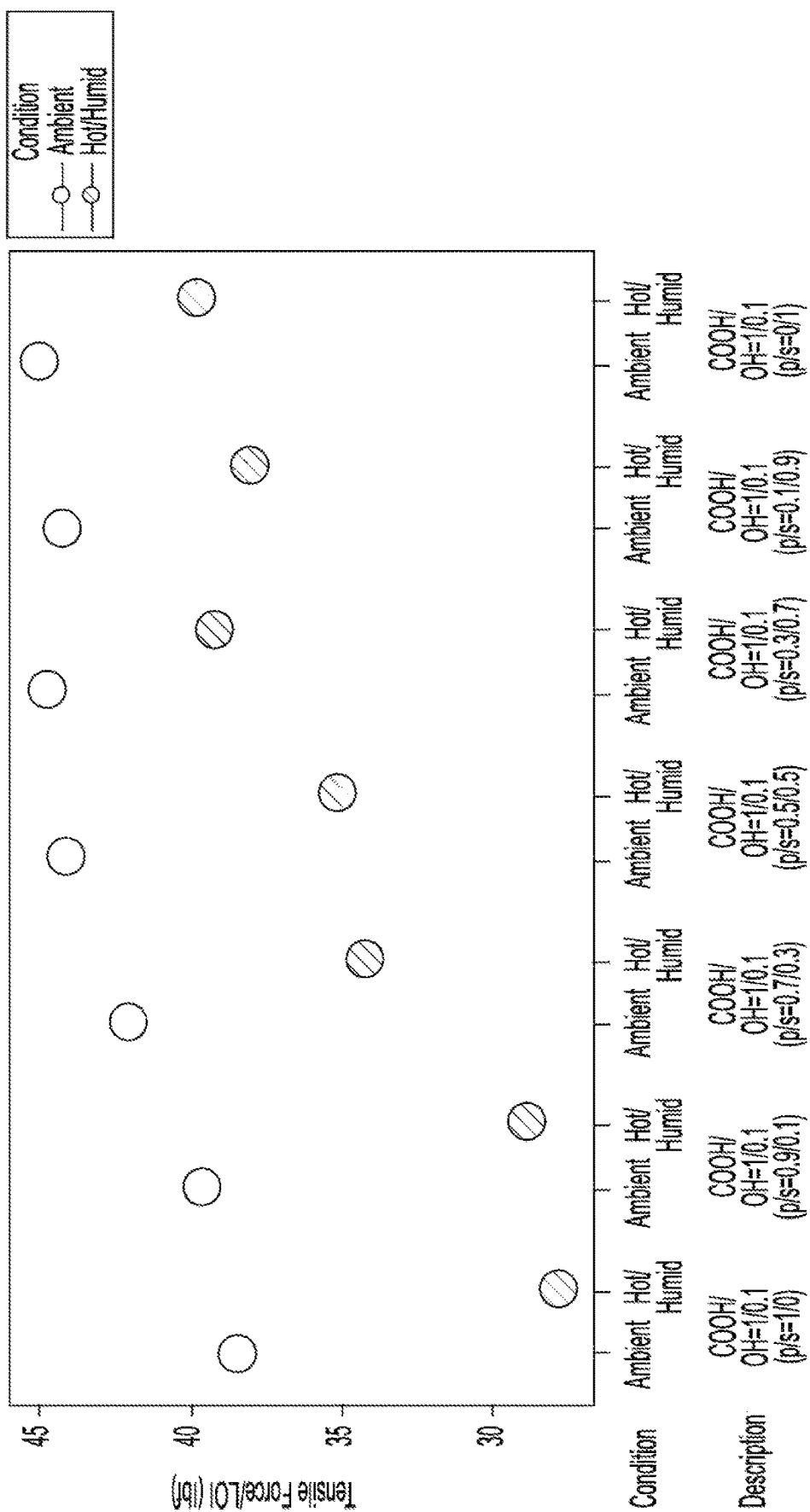
FIG. 11 graphically illustrates the tensile force/LOI for exemplary cured binder compositions having a ratio of molar equivalent carboxylic acid groups/hydroxyl groups of 1/1 and varying long-chain polyol/short-chain polyol ratios.
Figure 12:
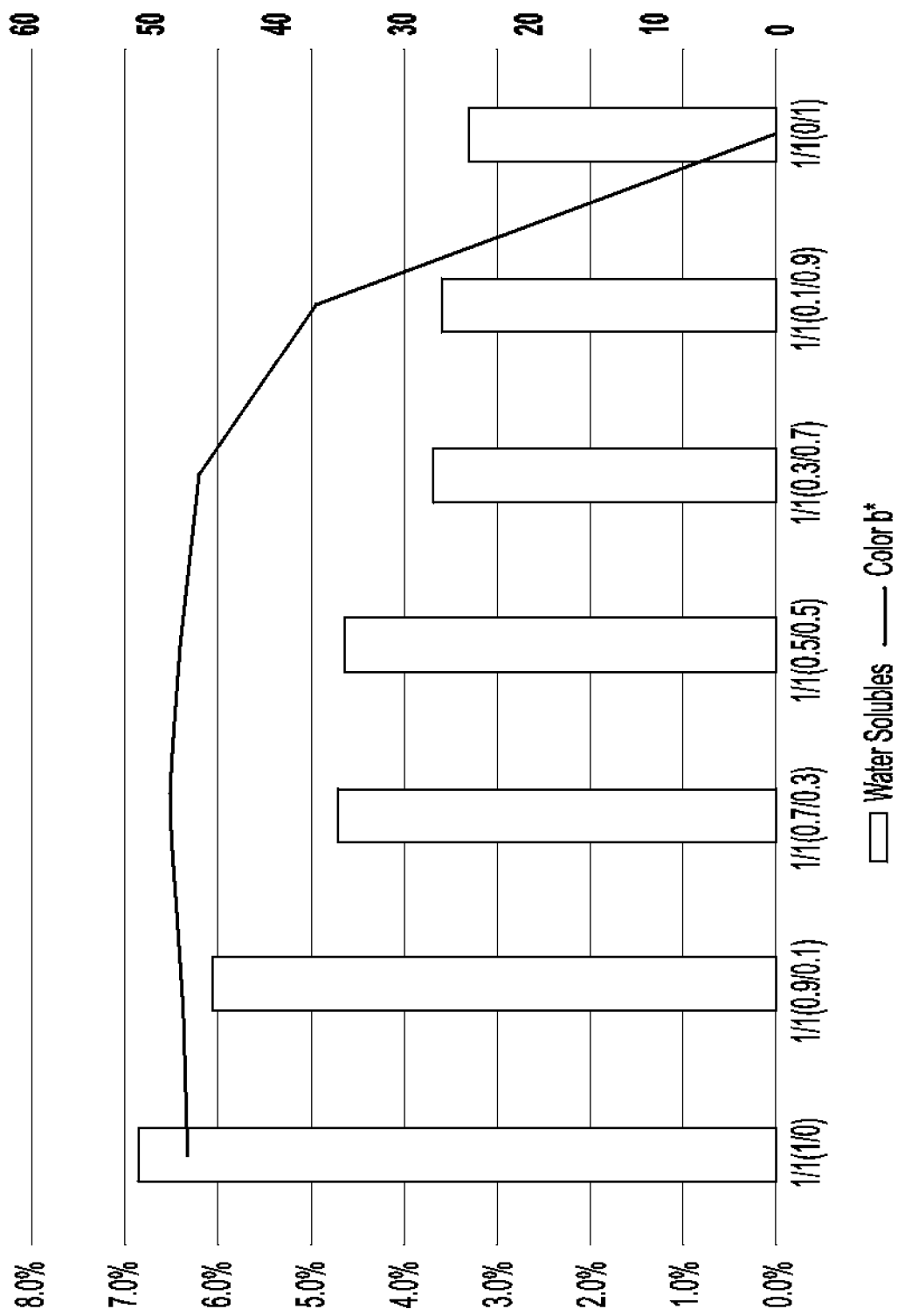
FIG. 12 graphically illustrates both the % water soluble material post-cure and color b* value for exemplary binder compositions having a ratio of molar equivalent carboxylic acid groups/hydroxyl groups of 1/0.5 and varying long-chain polyol/short-chain polyol ratios.

These relationships continue when the COOH/OH ratio is adjusted to 1/1.5, as illustrated in FIGS. 7 and 8. However, notably, the percentage of water soluble materials remaining in the composition after cure is substantially lower at this COOH/OH range. For instance, even in a composition lacking any short-chain polyol, the percentage water soluble material is less than 8.0% and after some short-chain polyol is added, the percentage drops below 5.0%.

As the COOH/OH ratio is adjusted to 1/0.5 and 1/1, however, although both the percent water soluble material and b* color value similarly decline with increasing ratio of short-chain polyol, both the ambient and hot/humid tensile strengths remained relatively constant regardless of the long-chain/short-chain polyol ratio. See FIGS. 9 through 12. It should be noted, however, that the highest ambient tensile strengths/LOI were demonstrated at long-chain/short-chain polyol ratios of 0.5/0.5 and 0.3/0.7, when the COOH/OH ratio was 1/0.5 (tensile strengths/LOI of 44 and 45, respectively).

EXAMPLE 3

Binder compositions with varying ratios were utilized to form fiberglass insulation board (e.g., ceiling tiles). The insulation boards formed with binder compositions according to the preset application (labeled as PAA/S/PVOH in various ratios of polyacrylic acid/sorbitol/polyvinyl alcohol) were compared to boards formed using both a conventional carbohydrate-based binder composition ("Starch-Hybrid Binder Board") and a phenol urea formaldehyde binder composition ("PUF Board"). The elastic modulus, compressive strength (delta b), and sag (inches) for each sample was determined under ambient conditions.

Figure 13:
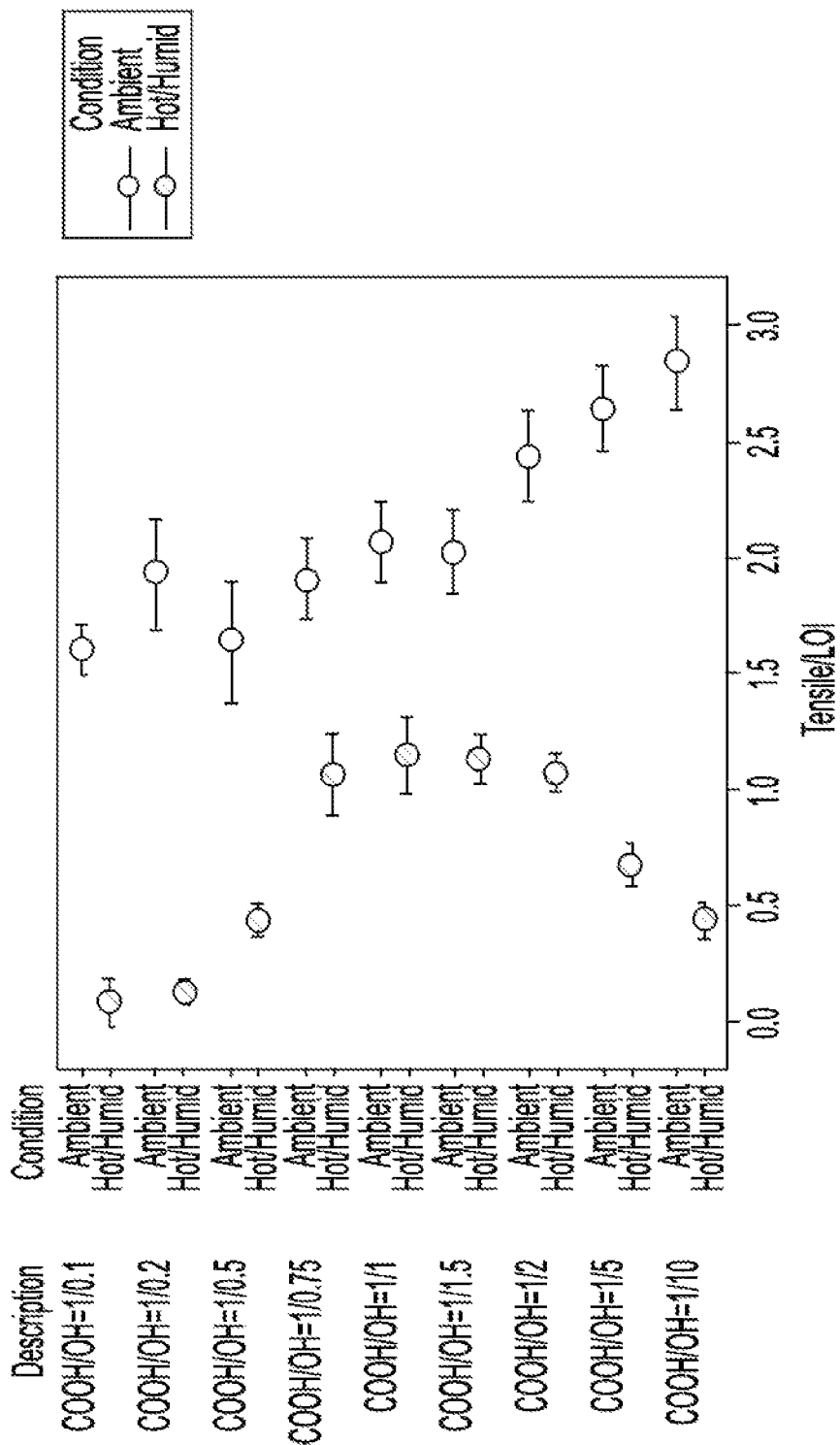
FIG. 13 graphically illustrates the tensile force/LOI for exemplary cured binder compositions having varied ratios of molar equivalent carboxylic acid groups/hydroxyl groups.

As illustrated in FIG. 13, each of the PAA/S/PVOH insulation board samples demonstrated improved Flexural Elastic Modulus, as compared to both conventional carbohydrate-based binder compositions and phenol urea formaldehyde-based binder compositions. PAA/S/PVOH 50:20:30 and PAA/S/PVOH 60:10:30 demonstrated the greatest improvement, with Flexural Elastic Modulus levels at 70 psi and 68 psi, respectively. In contrast, the PUF Board demonstrated a Flexural Elastic Modulus of 46 psi and the Starch-Hybrid Binder Board demonstrated an elastic modulus of 31 psi. In some exemplary embodiments, an insulation board with a thickness of 1 inch and a density of 6 lbs/ft³ according to the present inventive concepts achieves an elastic modulus of at least 40 psi, including at least 45 psi, at least 50 psi, and at least 55 psi.

Figure 14:
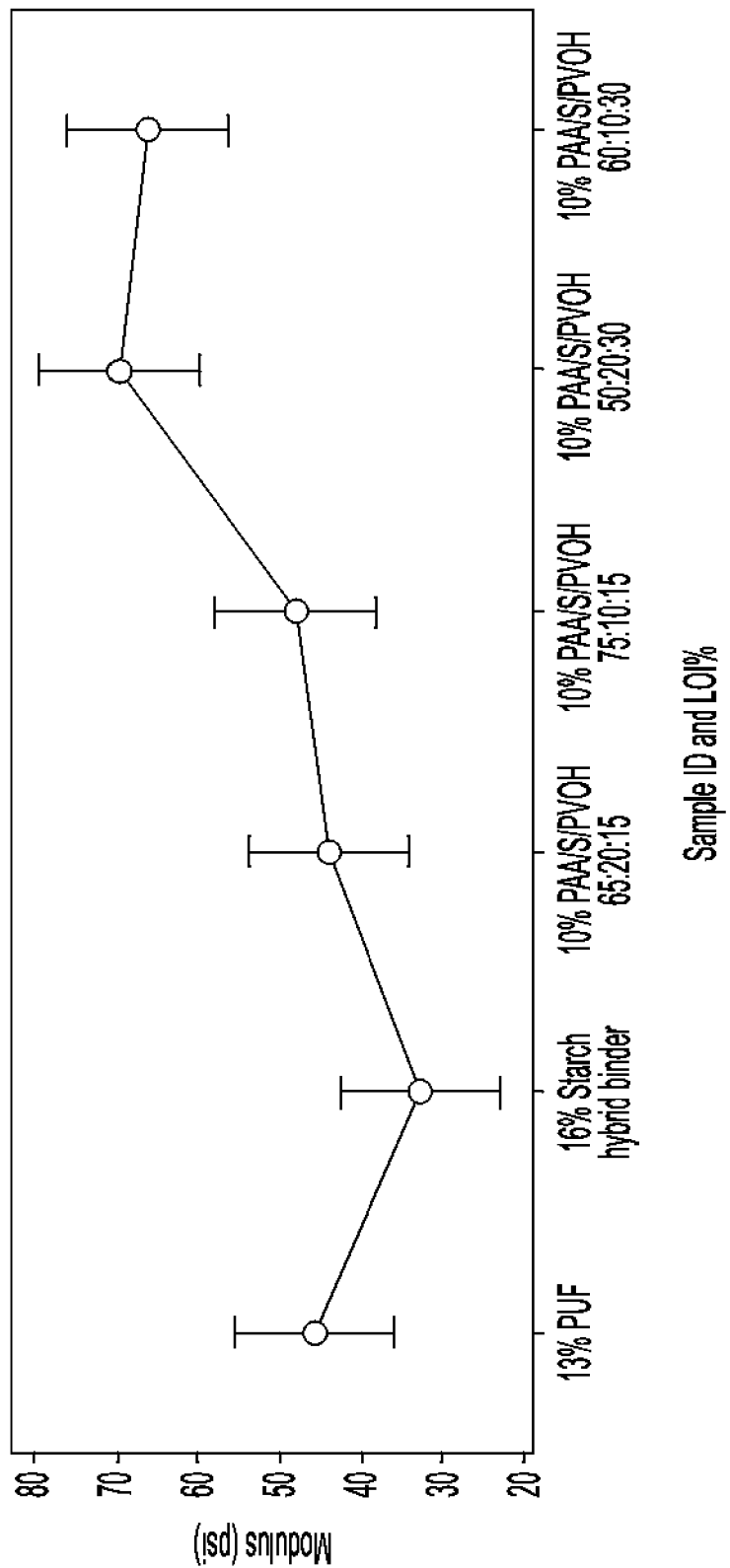
FIG. 14 graphically illustrates the flexural elastic modulus for plant trial boards formed using various binder compositions in accordance with the subject application, compared to conventional starch-hybrid binder compositions and phenol urea formaldehyde-based binder compositions.

FIG. 14 illustrates the sag observed by various 4'×4' insulation board panels after a set number of days in a hot/humid environment at 90 F/90% rH (relative humidity).

As shown in FIG. 14, the PAA/S/PVOH binder compositions having lower levels of PVOH (i.e., PAA/S/PVOH 60:20:15 and PAA/S/PVOH 75:10:15) demonstrated less sag under hot/humid conditions than both PUF Board and Starch-Hybrid Binder Board. This indicates that lowering the long-chain polyol in the binder compositions may help improve the hot/humid performance in applications that need very high standard of hot and humid performances.

Figure 15:
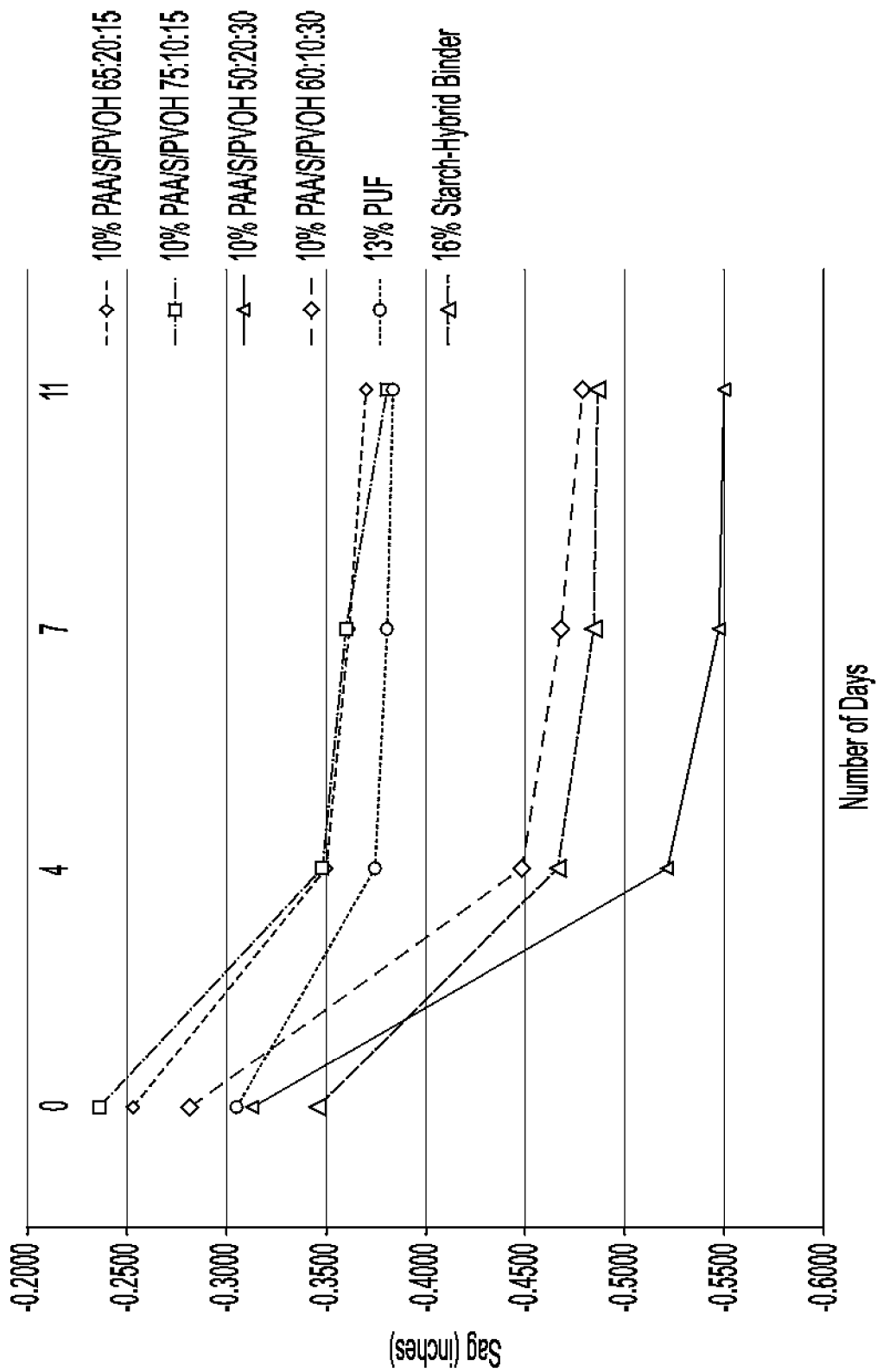
FIG. 15 graphically illustrates the sag for 4'×4' fiberglass insulation ceiling board tiles formed using various binder compositions in accordance with the subject application, compared to conventional starch-hybrid binder compositions and phenol urea formaldehyde-based binder compositions under hot/humid conditions.

FIG. 15 illustrates the compressive strength at 10% deformation of fiberglass board products of different binders and LOI %. The test was performed on 6"×6" insulation boards, with a thickness 1" and density 6 lb/ft³, according to ASTM method C-165. As illustrated in FIG. 15, the compressive strength of the insulation boards formed with a PAA/S/PVOH binder exceeded that of insulation boards formed with both a starch-hybrid binder and a PUF binder, demonstrating compressive strengths of 260 lbs/ft³ to over 500 lbs/ft³. In some exemplary embodiments, a 6"×6" insulation board with a thickness of 1 inch according to the present inventive concepts achieves a compressive strength of at least 200 lbs/ft³, including at least 300 lbs/ft³, at least 400 lbs/ft³, and at least 500 lbs/ft³.

Figure 16:
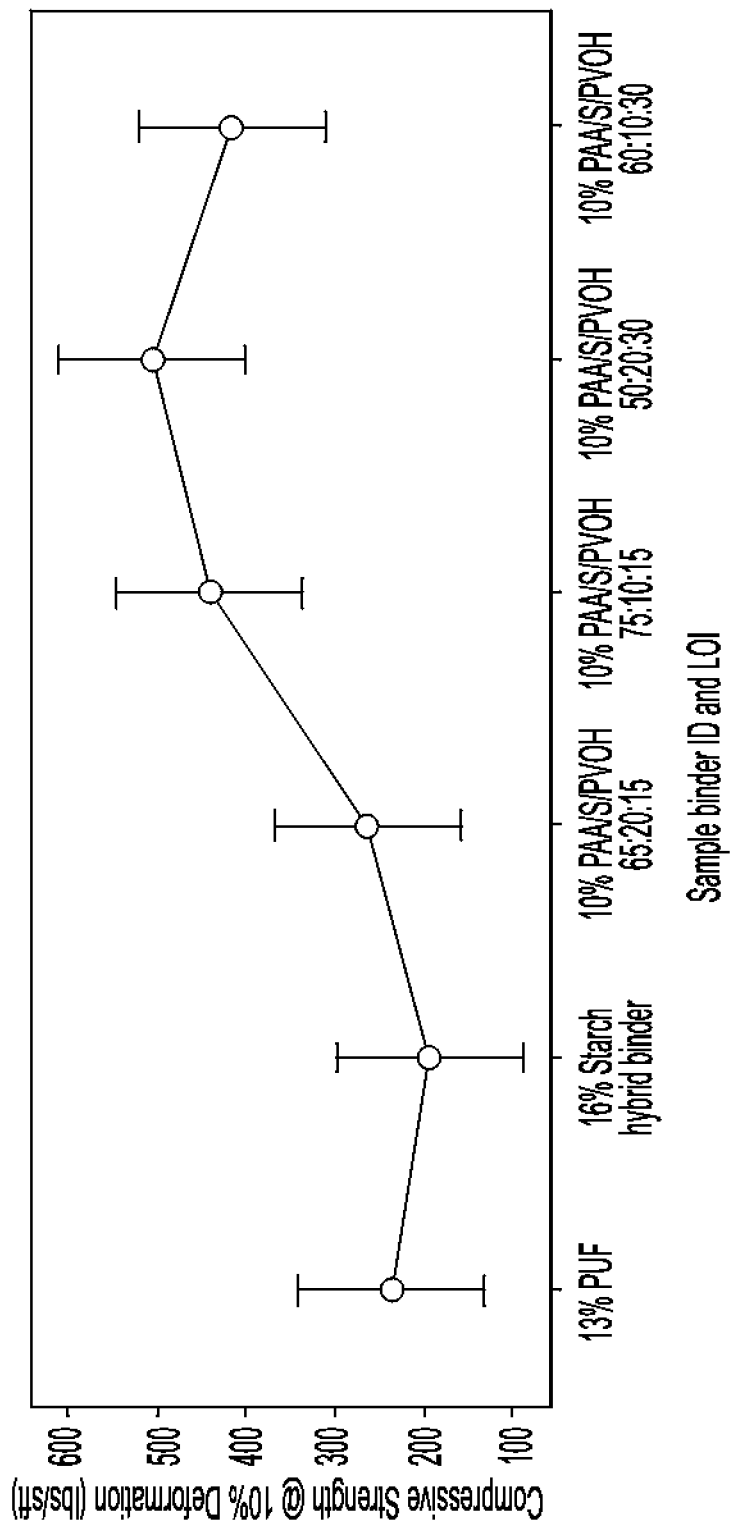
FIG. 16 graphically illustrates the compressive strength of plant trial board products, formed using various binder compositions in accordance with the subject application, compared to conventional starch-hybrid binder compositions and phenol urea formaldehyde-based binder compositions.
Figure 17:
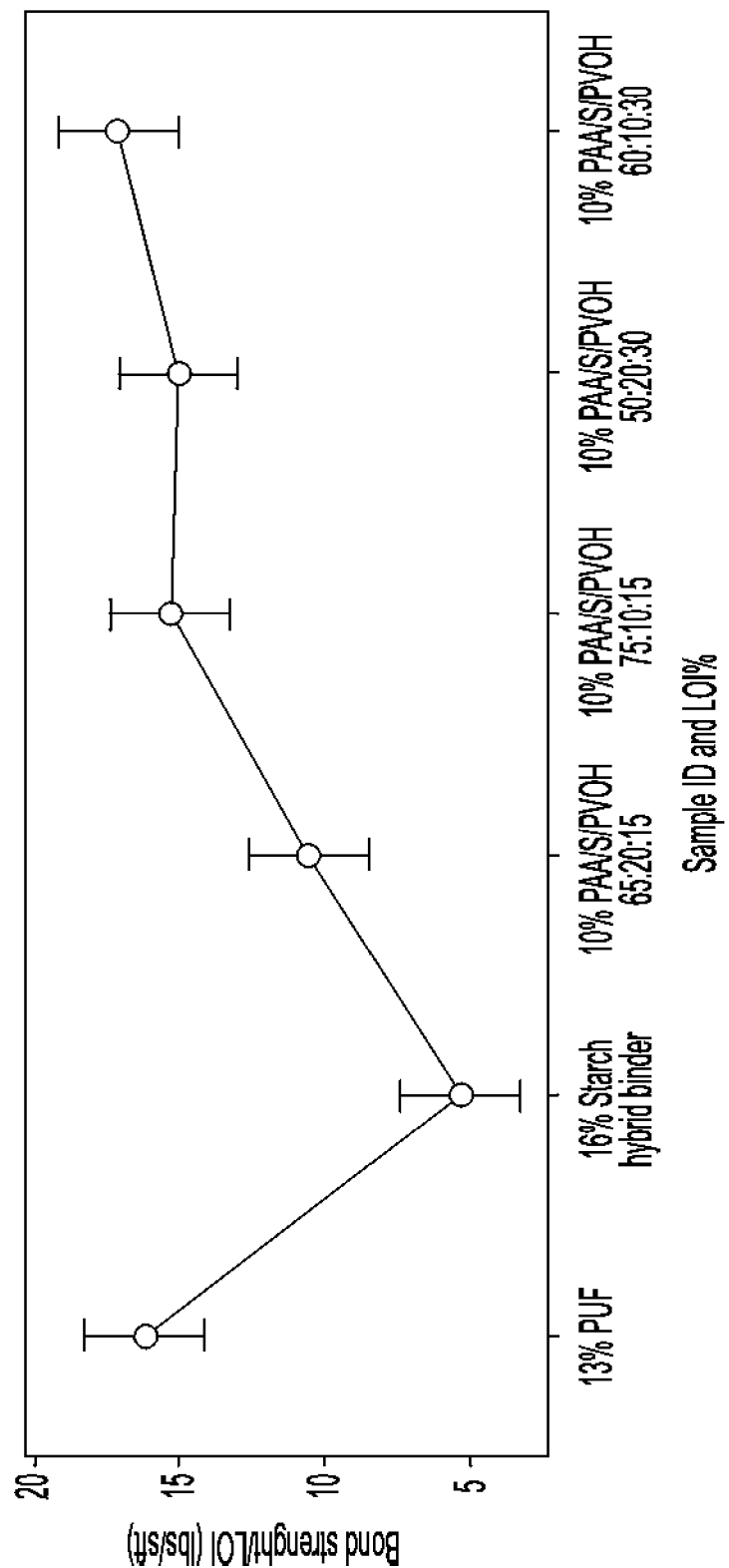
FIG. 17 graphically illustrates the bond strength at break of plant trial board products formed using various binder compositions in accordance with the subject application, compared to conventional starch-hybrid binder compositions and phenol urea formaldehyde-based binder compositions.

FIG. 16 illustrates the bond strength at break of fiberglass board products of different binders and LOI %. The test measures the strength in Z direction of 6"×6" insulation boards with a thickness of 1" and density of 6 lb/ft³. As illustrated in FIG. 16, the bond strength of insulation boards formed with PAA/S/PVOH binders exceeded that of insulation board formed with a starch-hybrid binder. Additionally, the insulation boards formed with PAA/S/PVOH binders demonstrated a comparable bond strength to insulation boards formed with a PUF binder, demonstrating bond strengths of 10 lbs/ft² to over 15 lbs/ft². In some exemplary embodiments, a 6"×6" insulation board with a thickness of 1 inch according to the present inventive concepts achieves a bond strength of at least 7.5 lbs./ft²/LOI, including at least 10 lbs./ft²/LOI, at least 12.5 lbs./ft²/LOI, and at least 15 lbs./ft²/LOI.

It will be appreciated that many more detailed aspects of the illustrated products and processes are in large measure, known in the art, and these aspects have been omitted for purposes of concisely presenting the general inventive concepts. Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

What is claimed is:
1. A low-density fibrous insulation product comprising:
  a plurality of randomly oriented fibers; and
  a thermoset aqueous binder composition at least partially coating said fibers, said binder composition comprising:

at least one long-chain polyol having at least two hydroxyl groups and a number average molecular weight of at least 2,000 Daltons;

at least 65 wt. % of a cross-linking agent comprising polymeric polycarboxylic acid, based on the total solids content of the aqueous binder composition; and a short-chain polyol having at least two hydroxyl groups and a number average molecular weight less than 2,000 Daltons, wherein a ratio of long-chain polyol to short-chain polyol is from 0.1/0.9 to 0.9/0.1, wherein the low-density fibrous insulation product has a density between 0.1 and 2.5 lbs/ft³.

2. The low-density fibrous insulation product of claim 1, wherein the fibers comprise one or more of mineral fibers, natural fibers, and synthetic fibers.

3. The low-density fibrous insulation product of claim 1, wherein the low-density insulation product has a thickness between 0.5 and 25 inches.

4. The fibrous insulation product of claim 1, wherein the low-density insulation product is an insulation batt, insulation blanket, duct wrap, or metal building insulation.

5. The low-density fibrous insulation product of claim 1, further including one or more reinforcement or scrim materials adhered to the fibrous insulation product.

6. The low-density fibrous insulation product of claim 1, wherein the fibrous insulation product has a binder LOI between 0.5% and 9%.

7. The low-density fibrous insulation product of claim 1, wherein a ratio of molar equivalents of carboxylic acid groups to hydroxyl groups in the binder composition is from 1/0.05 to 1.0/5.0.

8. A high-density fibrous insulation product comprising:
a plurality of randomly oriented fibers; and
a thermoset aqueous binder composition at least partially coating said fibers, said binder composition comprising:
    at least one long-chain polyol having at least two hydroxyl groups and a number average molecular weight of at least 2,000 Daltons;
    at least 65 wt. % of a cross-linking agent comprising polymeric polycarboxylic acid, based on the total solids content of the aqueous binder composition; and
    a short-chain polyol having at least two hydroxyl groups and a number average molecular weight less than 2,000 Daltons, wherein a ratio of long-chain polyol to short-chain polyol is from 0.1/0.9 to 0.9/0.1,
    wherein the high-density fibrous insulation product has a density between 2.5 and 10 lbs/ft³.

9. The high-density fibrous insulation product of claim 8, wherein the high-density fibrous insulation product has a thickness between 0.2 and 5.0 inches.

10. The high-density fibrous insulation product of claim 8, wherein the high-density fibrous insulation product comprises wall or ceiling insulation, pipe or tank insulation, duct board, industrial board, or acoustic board.

11. A ceiling board product comprising the high-density fibrous insulation product of claim 8.

12. The ceiling board product of claim 11, wherein the high-density fibrous insulation product comprises glass fiber having a diameter between 35 HT and 50 HT.

13. The ceiling board product of claim 11, wherein the high-density fibrous insulation product includes a binder LOI between 8% and 16%.

14. The ceiling board product of claim 11, wherein the board has a finished ceiling tile sag rating of less than 0.3" under both ambient and hot/humid conditions.

15. The ceiling board product of claim 11, wherein the board achieves a flame spread of no greater than 5, according to ASTM E84.

16. A duct board product comprising the high-density fibrous insulation product of claim 8.

17. The duct board product of claim 16, wherein the high-density fibrous insulation product comprises glass fiber having a diameter between 20 HT and 80 HT.

18. The duct board product of claim 16, wherein the high-density fibrous insulation product comprises a density between 2.5 lbs/ft³ and 6.0 lbs/ft³.

19. The duct board product of claim 16, wherein the high-density fibrous insulation product has a thickness between 0.5 and 5.0 inches.

20. The duct board product of claim 16, wherein the high-density fibrous insulation product includes a binder LOI between 13% and 23%.

21. The duct board product of claim 16, further including a facer adhered to the first major surface.

22. The duct board product of claim 21, wherein the facer comprises a coated fiber mat facer or a foil-scrim-kraft (FSK) facer.

23. The duct board product of claim 16, further including a veil adhered to the second major surface.

24. The duct board product of claim 23, wherein the veil comprises a fiberglass veil comprising glass fibers with diameters between 10 and 15 microns.

* * * * *